(12) United States Patent
Lee et al.

(10) Patent No.: US 6,751,459 B1
(45) Date of Patent: Jun. 15, 2004

(54) NOMADIC COMPUTING WITH PERSONAL MOBILITY DOMAIN NAME SYSTEM

(75) Inventors: Hee C. Lee, Plano, TX (US); Kalyan K. Basu, Plano, TX (US); Fred Homayoun, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/295,030

(22) Filed: Apr. 20, 1999

(51) Int. Cl.[7] .................................................. H04Q 7/20
(52) U.S. Cl. ...................................... 455/445; 455/432.1
(58) Field of Search ............................. 455/445, 432.1, 455/435.1, 433, 414.1, 456.1, 432.2, 432.3; 370/351, 352, 409; 709/245

(56) References Cited

U.S. PATENT DOCUMENTS

| | | | | |
|---|---|---|---|---|
| 5,329,578 A | * | 7/1994 | Brennan et al. | 379/211.03 |
| 6,075,783 A | * | 6/2000 | Voit | 370/352 |
| 6,161,008 A | * | 12/2000 | Lee et al. | 455/414 |
| 6,195,705 B1 | * | 2/2001 | Leung | 709/245 |
| 6,374,246 B1 | * | 4/2002 | Matsuo | 707/10 |
| 6,442,616 B1 | * | 8/2002 | Inoue et al. | 709/245 |
| 6,466,571 B1 | * | 10/2002 | Dynarski et al. | 370/352 |

OTHER PUBLICATIONS

Lee et al.; PMDNS Naming and Addressing Resolution in Webtone; Sep. 24, 1998; pp. 1–93.

* cited by examiner

Primary Examiner—Erika Gary

(57) ABSTRACT

A method and apparatus for updating information in a personal mobility database server with information concerning a user's nomadicity. When the user travels from one place to another, the user registers with PMDNS server at an IP port for computing communications. PMDNS takes user's terminal personalization, together with usage profile, session characteristics into account to map a party's identifier to a terminal's identifier. The IP address of the user's current location is used in concert with the terminal's identifier, which is itself an IP address, to route incoming computing communications connection requests to the current location of the user. This information will be returned by the PMDNS directory server to the access network for the setup of the communications.

11 Claims, 8 Drawing Sheets

| User Record | Personal Identifier (PID) 401 | Password 402 | User Profile 403 | Historical Usage Table 404 | Network Usage Profile 405 | Type (Terminal Capability) 406 | Terminal Identifier (TID) 408 | Care-of-Address (COA) 409 | Time Last Used 411 |
|---|---|---|---|---|---|---|---|---|---|
| 412 | tom@nortel.com (972) 555-9876 | Rocket | User Profile | Historical Usage Table | Network User Profile | voice | Work PSTN | | Time |
| | | | | | | voice | Cellular | | Time |
| | | | | | | voice | Home PSTN | | Time |
| | | | | | | voice | VOIP Address | | Time |
| | | | | | | data | Work IP Address | COA IP Extension | Time |
| | | | | | | data | Home PSTN | | Time |
| | | | | | | data | Cellular | | Time |
| | | | | | | data | Home IP Address | COA IP Extension | Time |
| 414 | assignedPID0078 (972) 555-3546 | Donkey | User Profile | Historical Usage Table | Network User Profile | voice | Home PSTN | | Time |
| | | | | | | voice | Work PSTN | | Time |
| | | | | | | voice | Cellular | | Time |
| | | | | | | data | Work IP Address | COA IP Extension | Time |
| | | | | | | data | Home IP Address | COA IP Extension | Time |
| 416 | rpetty@nortel.com (972) 555-1233 | 28DAW | User Profile | Historical Usage Table | Network User Profile | voice | Cellular | | Time |
| | | | | | | voice | Work PSTN | | Time |
| | | | | | | voice | Saturday Phone | | Time |
| | | | | | | voice | Home PSTN | | Time |
| | | | | | | Rdata | Room IP Address | COA IP Extension | Time |
| | | | | | | data | Work IP Address | COA IP Extension | Time |
| | | | | | | data | Home PSTN | | Time |
| | | | | | | data | Home IP Address | COA IP Extension | Time |
| 418 | bsmith@nortel.com | 287321 | User Profile | Historical Usage Table | Network User Profile | voice | Cellular | | Time |
| | | | | | | voice | Home PSTN | | Time |
| | | | | | | Rvoice | Rvoice PSTN | | Time |
| | | | | | | Rdata | Room IP Address | COA IP Extension | Time |
| | | | | | | data | Home IP Address | COA IP Extension | Time |

| User Record | Personal Identifier (PID) 401 | Password 402 | User Profile 403 | Historical Usage Table 404 | Network Usage Profile 405 | Type (Terminal Capability) 406 | Terminal Identifier (TID) 408 | Care-of-Address (COA) 409 | Time Last Used 411 |
|---|---|---|---|---|---|---|---|---|---|
| 412 | tom@nortel.com (972) 555-9876 | Rocket | User Profile | Historical Usage Table | Network User Profile | voice | Work PSTN | | Time |
| | | | | | | voice | Cellular | | Time |
| | | | | | | voice | Home PSTN | | Time |
| | | | | | | voice | VOIP Address | | Time |
| | | | | | | data | Work IP Address | COA IP Extension | Time |
| | | | | | | data | Home PSTN | | Time |
| | | | | | | data | Cellular | | Time |
| | | | | | | data | Home IP Address | COA IP Extension | Time |
| 414 | assignedPID0078 (972) 555-3546 | Donkey | User Profile | Historical Usage Table | Network User Profile | voice | Home PSTN | | Time |
| | | | | | | voice | Work PSTN | | Time |
| | | | | | | voice | Cellular | | Time |
| | | | | | | data | Work IP Address | COA IP Extension | Time |
| | | | | | | data | Home IP Address | COA IP Extension | Time |
| 416 | rpetty@nortel.com (972) 555-1233 | 28DAW | User Profile | Historical Usage Table | Network User Profile | voice | Cellular | | Time |
| | | | | | | voice | Work PSTN | | Time |
| | | | | | | voice | Saturday Phone | | Time |
| | | | | | | voice | Home PSTN | | Time |
| | | | | | | Rdata | Roam IP Address | COA IP Extension | Time |
| | | | | | | data | Work IP Address | COA IP Extension | Time |
| | | | | | | data | Home PSTN | | Time |
| | | | | | | data | Home IP Address | COA IP Extension | Time |
| 418 | bsmith@nortel.com | 287321 | User Profile | Historical Usage Table | Network User Profile | voice | Cellular | | Time |
| | | | | | | voice | Home PSTN | | Time |
| | | | | | | Rvoice | Rvoice PSTN | | Time |
| | | | | | | Rdata | Roam IP Address | COA IP Extension | Time |
| | | | | | | data | Home IP Address | COA IP Extension | Time |

FIG. 4

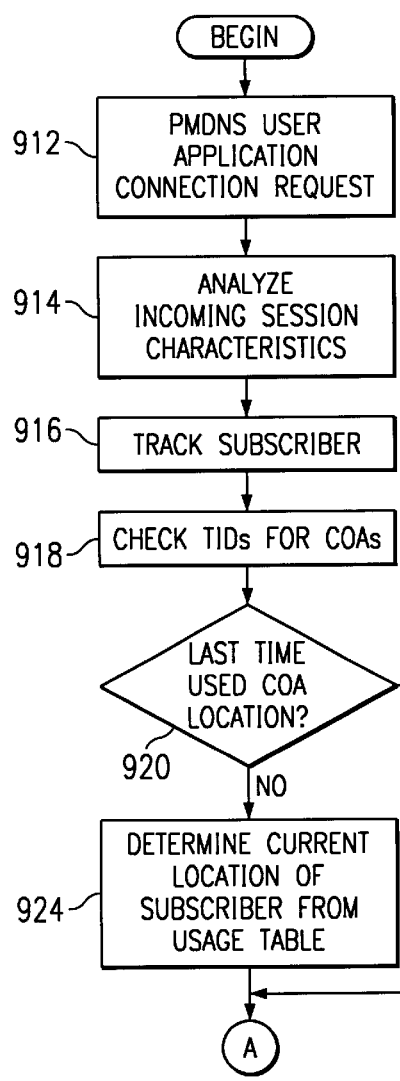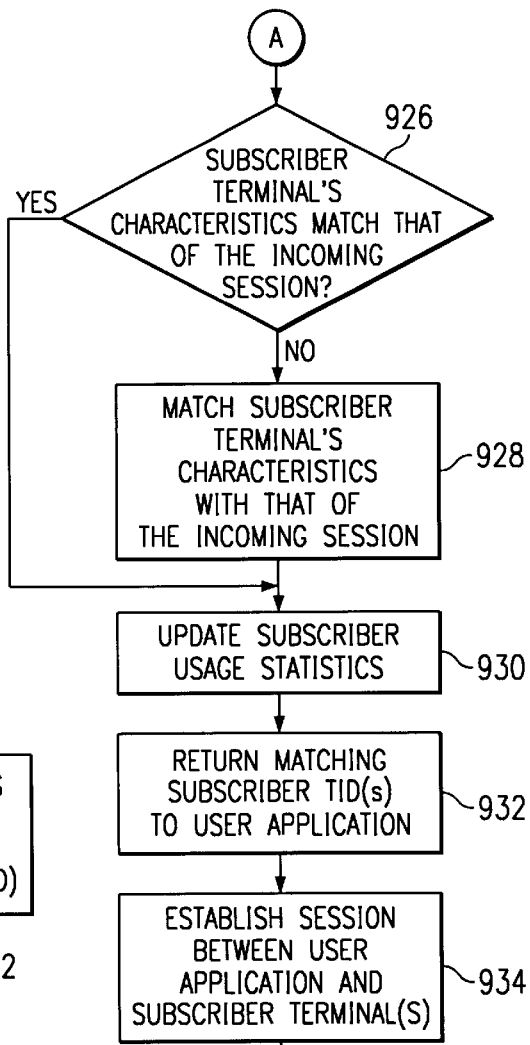
FIG. 9A
FIG. 9B

NOMADIC COMPUTING WITH PERSONAL MOBILITY DOMAIN NAME SYSTEM

FIELD OF THE INVENTION

The present invention relates generally to communications systems that service voice, data and multimedia communications and in particular to a method and apparatus for managing a personal mobility system that operates with a plurality of heterogeneous communication networks to route voice, data and multimedia communications to the user via one or more of a plurality of communication systems based on a personal identifier of the user. Still more particularly, the present invention relates to a method and apparatus for supporting nomadic computing of a personal mobility system with transparent virtual networking, information storage, and mobility when the user is traveling from one location to another and/or using different computer platforms or operating modes.

BACKGROUND OF THE INVENTION

Voice communication systems are well known in the art. Examples of voice communication systems include the Public Switched Telephone Network (PSTN), cellular wireless communication systems, and other systems that are primarily intended to service voice traffic. Data communication systems are also well known in the art. Examples of data communication systems include the Internet, Local Area Networks (LANs), Wide Area Networks (WANs), and asynchronous transfer mode (ATM) networks, among others.

While voice communication systems are primarily intended to service voice traffic, they may also be adapted to service data traffic. Likewise, data communication systems, while primarily intended to service data traffic, may also be adapted to service voice traffic (e.g., Internet Protocol (IP) Telephone). In 1996, for the first time in history, the volume of data traffic on carrier backbone networks exceeded the volume of voice traffic. This historical event signaled the fundamental transformation from networks dominated by voice to networks dominated by data. Today, data traffic is growing 10 times faster than voice traffic—more than 30 percent growth per year for data traffic versus 3 percent growth per year for voice traffic.

However, as the availability of communications increases, the difficulty of operating the resultant communication systems increases. For example, a single user may access the Internet, a public switched telephone network (PSTN), a cellular network, and other networks in a single day. The single user may be at a desk for part of the day, at home for a portion of the day, on the road for a portion of the day, and at yet other locations during other parts of the day. Therefore, it can be very difficult to determine how to reach the user by voice and/or to send data communications to a single user. Because the single user may be accessing any of these dissimilar networks at any given time, it is difficult, if not impossible, to direct a communication to the single user. Most particularly, it is extremely difficult to determine the appropriate number to dial or address to employ in the case where an immediate conversation (i.e., voice communication) is required.

In addition to the above mentioned mobility problems, now surfacing is the problem of personal computing mobility from mobile stations. The Internet's World Wide Web (WWW) interface has totally revolutionized the way information is accessed in all sectors of the economy. The availability of global services allows users to travel almost anywhere and still have access to the Internet. However, the system architecture needed to support nomads as they travel from one location to another is not yet in place.

Nomadicity is the term used to define the transparent, integrated and convenient form of system support needed to provide a rich set of computing and communications capabilities and services to nomads as they move from place to place. Nomadicity is a new paradigm in the use of computer and communications technology. The emergence of portable devices featuring high performance, low power requirements and compact size is changing the way we think about information processing. Access to computing and communications is now required not only within the office environment, but also during transit to/from various other locations. Nomadicity offers huge potential for improved capability and user convenience, yet it also presents a huge problem for interoperability.

Nomadic computing is a newly emerging technology. Among the solutions being proposed, mobile IP is the most prominent. Mobile IP is an extension of IP that allows mobile nodes to roam transparently from place to place within the Internet. Mobile IP affects the routing of datagrams within the Internet by effectively allowing the home agent to create a tunnel, using encapsulation, between the mobile node's home IP address associated with its home network and whatever care-of address identifies its current point of attachment.

The ability provided by mobile IP to deliver packets to a mobile computer or some other mobile station does not completely solve the problem of nomadic computing. Some of the key requirements imposed by nomadic computing include: enabling interoperation among many kinds of infrastructures; dealing with the unpredictability of user behavior, network capability and computing platforms; and delivering maximum independence between the network and the application. The emerging trend toward nomadicity is characterized by multimedia, networking and portability.

Likewise, there is a need in the art for a system and method of operation that employ multiple heterogeneous networks to effectively route communications among nomadic users.

Further, there is a need in the art for a system and method for supporting nomadic computing without upgrading or replacing system routers presently in use.

SUMMARY OF THE INVENTION

To overcome the shortcomings of the prior systems, among other shortcomings, the present invention provides a method and apparatus for nomadic computing by means of transparent virtual networking, information storage, and mobility when the user is traveling from one location to another and/or using different computer platforms or operating modes. Personal mobility domain name service (PMDNS) is originally designed to provide personal mobility via a personal identifier. Because of generic system architecture which uses the Internet as backbone, interoperating with existing access networks, it is also wise to provide nomadic computing services.

To accomplish such operations, a personal mobility directory server is updated with information concerning a user's nomadicity. When the user travels from one place to another, the user registers with a PMDNS server at an IP port for computing communications. The PMDNS employs the user's terminal personalization together with a usage profile and session characteristics to map a party's identifier to a terminal's identifier. The IP address of the user's current location can be used in concert with the terminal's identifier, which is in itself an IP address, to route incoming computing communications connection requests to the current location of the user. This information is returned by the PMDNS directory server to the access network for the setup of the communications.

In the present invention, a PMDNS operates in an environment with the Internet as backbone, cooperating with existing access networks, such as a PSTN or cellular network and doe not require the modification or replacement of existing routers. Therefore, the present invention enables nomadic computing in concert with other media. Also, the present invention is accomplished by means of an application protocol, PMDNS, rather than a network protocol that would not affect much of the existing protocol stack.

The present invention provides a means for dealing with the unpredictability of user behavior and changes in computing platform by association with terminal personalization provided in the PMDNS, while still allowing for cross-network nomadic computing. Finally, the present invention utilizes a PMDNS which applies session characteristics stored in a database as an input parameter to determine and return the TID(s) of the terminal(s) appropriate for the given session characteristics. This enables voice, data and/or multimedia services to be simultaneously matched to an incoming session.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a table representing a plurality of user records stored in a PMDNS database server and a portion of the information stored in such user records according to the present invention;

FIGS. 9A and 9B illustrate a typical connection sequence as seen from the perspective of the PMDNS server application.

DETAILED DESCRIPTION OF THE PREFERRED EMBODIMENT

Figure 1:
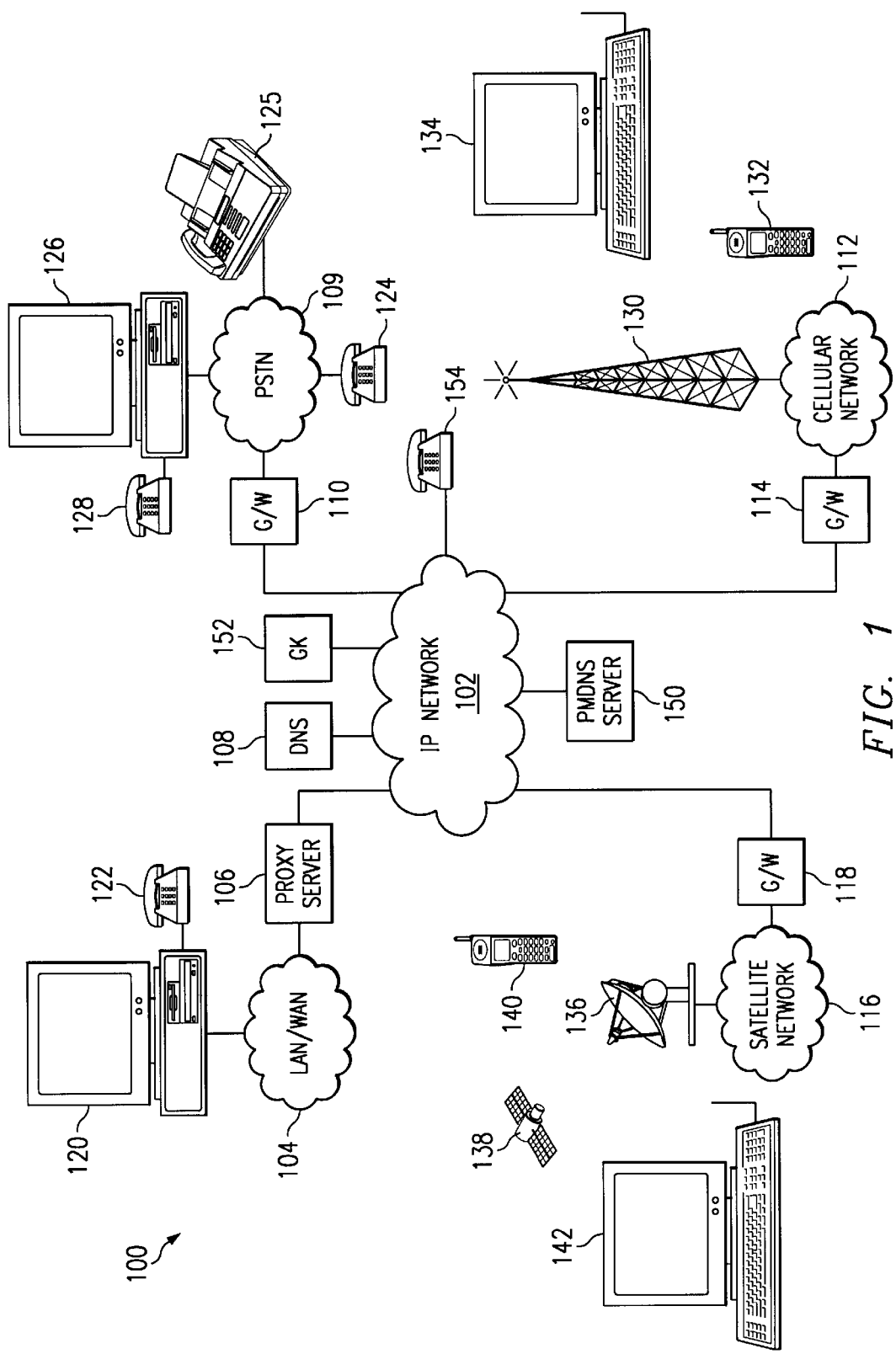
FIG. 1 is a system diagram illustrating a plurality of interconnected heterogeneous networks in which a personal mobility system constructed according to the present invention has been deployed.

FIG. 1 is a system diagram illustrating a plurality of interconnected heterogeneous networks in which a personal mobility system constructed according to the present invention is deployed. As illustrated, an Internet Protocol (IP) network 102, a Local Area Network (LAN)/Wide Area Network (WAN) 104, the Public Switched Telephone Network (PSTN) 109, a cellular wireless network 112, and a satellite communication network 116 make up the plurality of heterogeneous networks serviced by the personal mobility system of the present invention.

IP network 102 may be the publicly available IP network, a private IP network, or a combination of public and private IP networks. In any case, IP network 102 operates according to the Internet Protocol and routes packets among its many switches and through its many transmission paths. IP networks are generally known in the art to be expandable, fairly easy to use and heavily supported. Coupled to IP network 102 is a Domain Name Server (DNS) 108 to which queries may be sent, such queries each requesting an IP address based upon a Uniform Resource Locator (URL). IP network 102 supports 32 bit IP addresses as well as 128 bit IP addresses, which are currently in the planning stage.

LAN/WAN 104 couples to IP network 102 via a proxy server 106 (or another connection). LAN/WAN 104 may operate according to various communication protocols, such as the Internet Protocol, the Asynchronous Transfer Mode (ATM) protocol, or other known packet switched protocols. Proxy server 106 serves to route data between IP network 102 and LAN/WAN 104. A firewall that precludes unwanted communications from entering LAN/WAN 104 may also be located at the location of proxy server 106.

Computer 120 couples to LAN/WAN 104 and supports communications with LAN/WAN 104. Computer 120 may employ the LAN/WAN and proxy server 106 to communicate with other devices across IP network 102. Such communications are generally known in the art and will not be further described herein except to expand upon the teachings of the present invention. As is also shown, phone 122 couples to computer 120 and may be employed to initiate IP Telephony communications with another phone or voice terminal using IP Telephony. In such an IP telephony system, a gatekeeper 152 is deployed by a service provider to manage IP telephony for its users. An IP phone 154 connected to IP network 102 (or other phone, e.g., phone 124) may communicate with phone 122 using IP telephony.

PSTN 109 is a circuit switched network that is primarily employed for voice communications, such as those enabled by a standard phone 124. However, PSTN 109 also supports the transmission of data. Data transmissions may be supported to a tone based terminal, such as a FAX machine 125, to a tone based modem contained in computer 126, or to another device that couples to PSTN 109 via a digital connection, such as an Integrated Services Digital Network (ISDN) line, an Asynchronous Digital Subscriber Line (ADSL), or another digital connection to a terminal that supports such a connection. As illustrated, a voice terminal, such as phone 128, may couple to PSTN 109 via computer 126 rather than being supported directly by PSTN 109, as is the case with phone 124. Thus, computer 126 may support IP telephony with voice terminal 128, for example.

Cellular network 112 supports wireless communications with terminals operating in its service area (which may cover a city, county, state, country, etc.). As is known, cellular network 112 includes a plurality of towers, e.g., 130, that each service communications within a respective cell. Wireless terminals that may operate in conjunction with cellular network 112 include wireless handsets 132 and wirelessly enabled laptop computers 134, for example. Cellular network 112 couples to IP network 102 via gateway 114.

Cellular network 112 operates according to an operating standard, which may be the Advanced Mobile Phone System (AMPS) standard, the Code Division Multiple Access (CDMA) standard, the Time Division Multiple Access (TDMA) standard, or the Global System for Mobile Communications or Groupe Speciale Mobile (GSM), for example. Independent of the standard(s) supported by cellular network 112, cellular network 112 supports voice and data communications with terminal units, e.g., 132 and 134.

Satellite network 116 includes at least one satellite dish 136 that operates in conjunction with a satellite 138 to provide satellite communications with a plurality of terminals, e.g., laptop computer 142 and satellite handset 140. Satellite network 116 may be serviced by one or more geosynchronous orbiting satellites, a plurality of medium earth orbit satellites, or a plurality of low earth orbit satellites. In any case, satellite network 116 services voice and data communications and couples to IP network 102 via gateway 118.

According to the present invention, a personal mobility domain name system (PMDNS) includes a PMDNS server 150 and a PMDNS user application. Each PMDNS user application is either contained on a terminal of a user or a gateway, e.g., 110, 114 or 118. Terminal computer 120, computer 126, phone 124, laptop computer 134, cellular phone 132, laptop computer 142, and satellite handset 140 are all compliant with the personal mobility system. However, not all of these terminals support the PMDNS user application. In such cases, the PMDNS user application resides upon a related gateway. In this fashion, each of these terminals accesses a PMDNS user application that operates in conjunction with PMDNS server 150 to provide personal mobility system operation according to the present invention.

According to the present invention, a personal identifier (PID) is assigned to each user of the personal mobility system. The PID serves as a thread to a group or series of terminals, each identified by its terminal identifier (TID, also referred to interchangeably as terminal address). For example, Tom Jones, who works at Nortel Networks, has the email address: tom@nortel.com. This email address also serves as PID for Tom Jones. However, if Tom Jones does not have an email address, Jones's PID could be Jones's phone number, e.g., (972) 684-0800.

At least one TID is associated with the PID of Tom Jones. For example, assume that at work Tom Jones uses computer 120, which is coupled to IP network 102 via LAN/WAN 104. Computer 120 has a unique address at which it may be reached. Such unique address is the TID for computer 120 and is associated with the PID of tom@nortel.com. Additionally, phone 122 serves as Tom Jones's wired work phone. Thus, the phone number (972) 684-0800, which may be used to dial phone 122, is the TID for such phone and is associated with the PID of Tom Jones. Moreover, Tom Jones has a home computer 126 coupled to IP network 102 via PSTN 109. Home computer 126 has an associated phone number of (214) 891-2368, which serves as the TID for computer 126 and is associated with the PID of Tom Jones. Finally, cellular phone 132 is used by Tom Jones while Jones is traveling. The number (972) 555-3234 of the cellular phone serves as the TID for cellular phone 132 and is associated with Tom Jones's PID. Each of these TIDs is stored on PMDNS server 150, cross-referenced to Tom Jones's PID, and may be accessed when an attempt is made to locate Tom Jones.

The PID serves to identify a user and an entry point for operation with the PMDNS of the present invention. When a called user's PID is launched with desired service options by a PMDNS user application, the user terminal queries PMDNS server 150 in IP network 102 for one or more TIDs corresponding to the PID. The PMDNS server application receives a request from the PMDNS user application and makes an intelligent network routing decision regarding 'when the user is using what terminal and type of service desired, e.g., plain old telephone service (POTS) voice, email, video, and even incoming fax.' This decision is based upon the user's normal behavior observed by the network or the user's direct indication. Thus, the PMDNS server application maps the PID to a certain TID. The selected TID and the IP address of its associated gateway are sent to the user's terminal or to the access network for the setup and delivery of the session to the user at that terminal.

The goal of reaching the user at an appropriate terminal based upon the launched PID is similar to the concept of searching for an IP address from the domain name via a DNS 108. However, DNS 108 alone is not sufficient to solve the addressing problem since it only maps URLs to IP addresses. While expansion of DNS resources to provide such additional mapping could also be used, this approach presents several disadvantages, including large storage requirements, lengthy searching time, a limitation to static data, no multimedia support, and the need for a new unified phone number. Further, because the construction of DNSs has become substantially standardized, altering DNSs to accomplish such tasks would require replacement/modification of all DNSs that have been deployed.

According to a described embodiment, the PMDNS complies with the Internet Directory Enabled Network (DEN) architecture to separate the directory service traffic from conventional DNS service traffic. PMDNS uses dynamic data to provide the most currently active terminal addresses of users by tracking the mobility of their usage. Thus, PMDNS also supports multimedia service and mobile IPv6. PMDNS uses DNS-like information flows and message formats between PMDNS server 150 and the PMDNS user application.

Using such a technique, a particular user may be contacted at the terminal where the user is most likely to be present at the given time, such terminal also having the proper capability to receive the incoming session. In a sense, the PID is a counterpart of the high-level machine name in DNS, and the TID is a counterpart of the low-level IP address in a DNS. The PMDNS server that maps the PID to an actual TID is a counterpart of the DNS server. The PMDNS directory stores the information about the user, including PID, associated TIDs, billing address, service option(s), etc. It is a counterpart of database storing resource records (RRs).

However, the PMDNS is different from the DNS in several aspects. First, the directory service traffic is separated from the conventional DNS service traffic, which makes it easy to add new value-added service and to comply with the DEN architecture concept. Second, the information provided by the PMDNS is dynamic data, which takes into account mobility information, unlike the static data provided by the conventional DNS. Thirdly, the PMDNS will support multimedia service. In selecting a proper TID, the incoming session's characteristic and the terminal's capability—whether voice, video, data or short message—are both considered.

Figure 2:
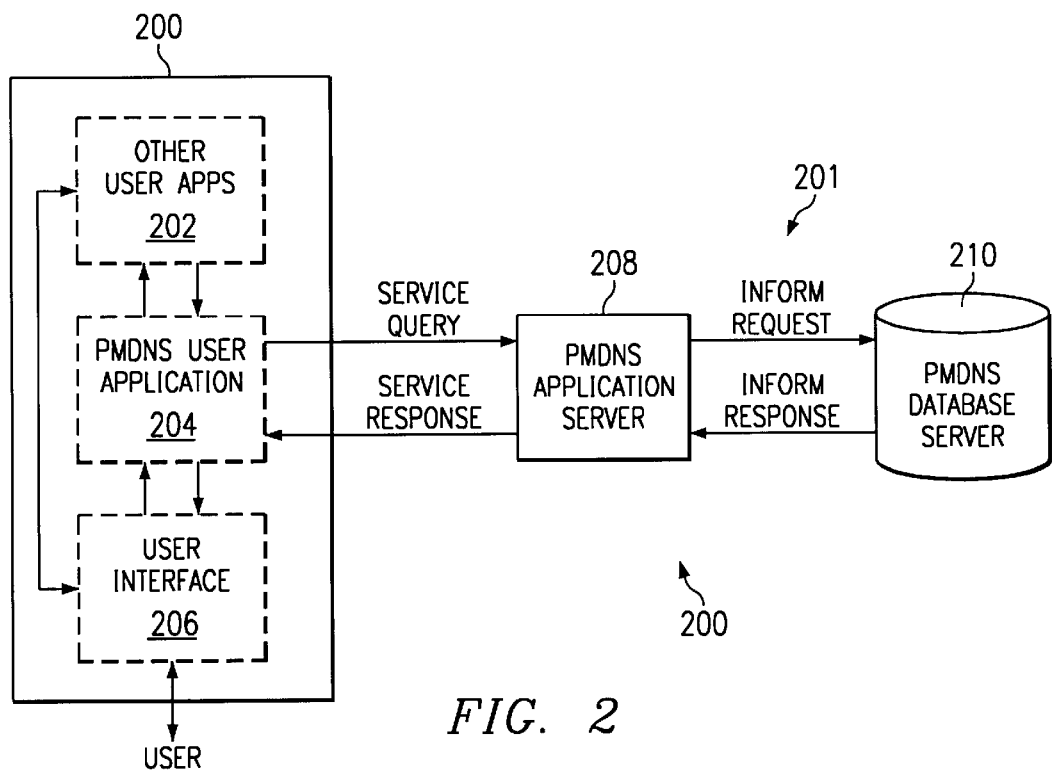
FIG. 2 is a block diagram generally illustrating the structure and interaction of components of a personal mobility system constructed according to the present invention.

FIG. 2 is a block diagram generally illustrating the structure and interaction of components of a personal mobility system constructed according to the present invention.

Illustrated is a user terminal 200 and a PMDNS server 201 that includes a PMDNS server application 208 and a PMDNS database server 210. The user terminal 200 has thereupon a PMDNS user application 204, which communicates with the PMDNS server application 208.

User terminal 200 may be a computer, a PMDNS enabled phone, or another terminal capable of voice and/or data communications. User terminal 200 includes not only PMDNS user application 204, but also other user applications 202 and a user interface 206 that couples user terminal 200 to the user personally. Other user applications 202 that may be present on user terminal 200 depend upon the terminal type. For example, if user terminal 200 is a desktop or laptop computer, other user applications 202 may include communication programs, productivity programs, audio programs, or other programs that operate on a computer. If the user terminal is a phone, other user applications 202 may include messaging systems or other types of applications supported by the phone.

PMDNS user application 204 resides at the end user terminal or gatekeeper for an Internet terminal. Alternatively, for a traditional voice-based terminal (e.g., a terminal coupled to PSTN 109, cellular network 112, or satellite network 116), the PMDNS user application resides at the gateway or gatekeeper. PMDNS user application 204 is the user interface that accepts from the caller the launched PID of the called user with the desired service options and then returns to the caller the selected TID of the called user. Upon receiving a query having a launched PID, the PMDNS user application first checks a local cache to determine if the launched PID is available. If it is available and the time to live (TTL) has not expired, then the stored TID is returned to the caller. Otherwise, the PMDNS user application sends a query to its PMDNS server application 208, which checks PMDNS database server 210 to find a proper TID of the called user. In addition to providing the caller with a TID of the called user, the PMDNS user application also interprets the received TID and processes error messages when appropriate.

Within PMDNS user application 204, two configurations are made at the IP terminal or gateway/gatekeeper. First, the configuration of the address and TTL of its local PMDNS server application 208 are entered by the user. Second, the configuration of the user profile is entered by the user. Configuration of local PMDNS server application 208 can be accomplished by using dynamic host configuration protocol (DHCP), the server record (SRV) in DNS, service location protocol (SLP), or manual configuration. The original DHCP was designed to provide configuration parameters to Internet hosts.

Here, the information regarding PMDNS server application 208 could be identified as a new parameter passed by DHCP together with the existing parameters, such as IP addresses and the domain name of the host, router IP address, subnet mask, etc. The SRV record is a type of DNS resource record (RR) which specifies the location of the server(s) for a specific protocol and domain. Here, the location of the PMDNS server application is added to the SRV record and indexed under the given domain name of the host or the domain name of the host's router. SLP was originally designed for discovery and selection of network services using user agent (UA), service agent (SA) and directory agent (DA). To find the location of a service, UA sends out a service request to DA, which sends back a service reply with the address of the server providing the requested service. This scheme could be easily adapted to the discovering of a PMDNS server application. The manual configuration means the addresses of PMDNS server application 208 should be configured manually to the host(s) by a network administrator.

The configuration of the user profiles provides the user with control regarding selection of the terminal at which the user would like to be reached, overruling the possible terminal that the network may select. In this manner, the probability of successfully delivering an incoming session to the user can be improved. Besides, direct instruction from the user reduces signaling traffic and PMDNS server 201 load, which would otherwise make an intelligent guess regarding the terminal to receive delivery. The users can assign/delete preferences, query preferences, or change passwords through PMDNS user application 204. The messaging would observe a new protocol for the communications between PMDNS user application 204 and PMDNS server application 208, as well as the Lightweight Directory Access Protocol (LDAP) between PMDNS server application 208 and PMDNS database server 210.

PMDNS server application 208 couples to each user terminal via one or more intermediate heterogeneous networks. In the example of FIG. 1, PMDNS server 150 includes PMDNS server application 208 and PMDNS database server 210. In this case, PMDNS server application 208 couples to terminals via IP network 102 and, in some cases, LAN/WAN 104, PSTN 109, cellular network 112, and satellite network 116 as well. With PMDNS user application 204 resident upon a gateway, e.g., gateway 110, PMDNS user application 204 couples to PMDNS server application 208 via IP network 102 only.

Typical communications between PMDNS user application 204 and PMDNS server application 208 take the form of service queries and service responses. In a service query, PMDNS user application 204 requests that PMDNS server application 208 perform a function. Upon receipt of the service query, PMDNS server 208 may perform such function. Upon initial receipt of the service query, or subsequent to performing an operation based thereupon, the PMDNS server application may respond to PMDNS user application 204 in a service response.

PMDNS server application 208 is the engine running between PMDNS user application 204 and PMDNS database server 210, answering the question of which terminal(s) to reach when the user's PID is dialed. In other words, PMDNS server application 208 returns TID(s) when a query including a PID is received from PMDNS user application 204 requesting TID(s). The decision made by PMDNS server application 208 takes into account the information provided in the query from PMDNS user application 204, as well as the information retrieved from PMDNS database server 210.

Several decision-affecting factors are present. A first factor is the user profile, which is a direct indication from the user regarding the terminal upon which the user wants to receive any incoming session. Unless the user has de-registered for the terminal or the user's time-to-live registration has expired, the TID selected by the user is used in response to a PID query. However, as the user is not able to foresee the nature of an incoming session, it is possible that the user-selected terminal is not capable of receiving an incoming session, such as a mobile handset not being ready to receive a file transfer. It is proposed here that an announcement be made to the terminal. The incoming session can be delivered to a capability-ready terminal, or a media conversion can be made such that a modified incoming session can be delivered to the terminal. In one example of such an operation, voice is converted to text. In another example, text is converted to voice.

A second factor in the decision making is the terminal network usage profile, which is a profile of the probability of when the user might use which terminal for which capability. This network usage profile is used together with user profiles complementarily, that is, when the user profile is inactive, the terminal network usage profile is observed by the network. The terminal network usage profile is based upon historical usage and periodically updated to reflect observations of usage over a period of time, such as a week. Both the terminal network usage profile and historical usage data are stored in the PMDNS database server. Profile data is categorized according to terminal capability, and individual terminal usage is tracked according to probability of usage during various intervals on different days of the week.

The terminal network usage profile provides the network with the user's long-term behavior data; and short-term behavior, called last activity, is identified here as the third factor affecting network decision making. Last activity is used together with the terminal network usage profile to shape the network's decision as to which terminal is most likely to be used by a user at any given moment. This specific information is most useful when the time elapsed between last activity and current query is relatively small, given the strong likelihood in this case that the user is still near the terminal that was last active.

The fourth decision making factor is terminal capability. Ideally, an incoming session can be delivered to a terminal that is capable of reception. Both the session characteristic and the terminal capability are categorized as, for example, voice, data or multimedia. The session characteristic is conveyed in the PID query coming from the PMDNS user application, and terminal capability is indicated in the database.

PMDNS server application 208 interfaces with both PMDNS user application 204 and PMDNS database server 210. Communications between PMDNS user application 204 and PMDNS server application 208 use information flow and message format, both of which are DNS-based, with new values opened in certain fields of the message. Communications between PMDNS server application 208 and PMDNS database server 210 use the LDAP, following the DEN information model and the directory schema.

The information flow between PMDNS user application 204 and PMDNS server application 208 is simple query and response, as with the conventional DNS. The message format between PMDNS user application 204 and PMDNS server application 208 is also DNS-based, with certain modifications to the query and the response to accommodate personal mobility. The PID query is indicated in the OPCODE field, including the launched PID, dialing TID and session characteristic. The launched PID and dialing TID are placed in the QNAME field, while the session characteristic is indicated in the QTYPE field. The PID response includes the TID and the IP address of the gateway from the access network (if the endpoint is not an IP terminal). This TID and IP address is placed in the RDATA field in the Answer Section. If more than one TID is desired, for the purpose of simultaneous or sequential ringing, that information can be placed in the Additional Information Section.

In one embodiment, communication between PMDNS server application 208 and PMDNS database server 210 employs an LDAP, which is based on a user-server model and runs directly on TCP/IP. The LDAP provides a standards-based mechanism permitting any user, server or application to access any directory service supporting an LDAP interface.

PMDNS database server 210 stores all database user records required by PMDNS server application 208. Such database user records include the PIDs of the users and their related TIDs, among other information. In a typical database user record corresponding to a PID, PMDNS database server 210 stores a plurality of TIDs for each PID. In accessing PMDNS database server 210, PMDNS server application 208 issues an information request (or another request). In response to the information request, PMDNS database server 210 performs a database operation and returns an information response based upon the request. Such requests may include, for example, providing TIDs based on the PID supplied by PMDNS server application 208, adding user records, deleting user records, updating user records, adding terminal records for a TID, deleting terminal records for a PID, and/or modifying terminal records for a PID.

PMDNS server application 208 manages PMDNS database server 210 using LDAP and the DEN model, and uses its base schema to construct the information requested. PMDNS directory information is based on entries arranged in a hierarchical tree-like structure and divided among servers in a geographical/organizational distribution. An object is represented by a directory entry containing a set of attributes. There is a special attribute in each entry called objectClass, which identifies entry type and determines subsequent attributes.

Figure 3:
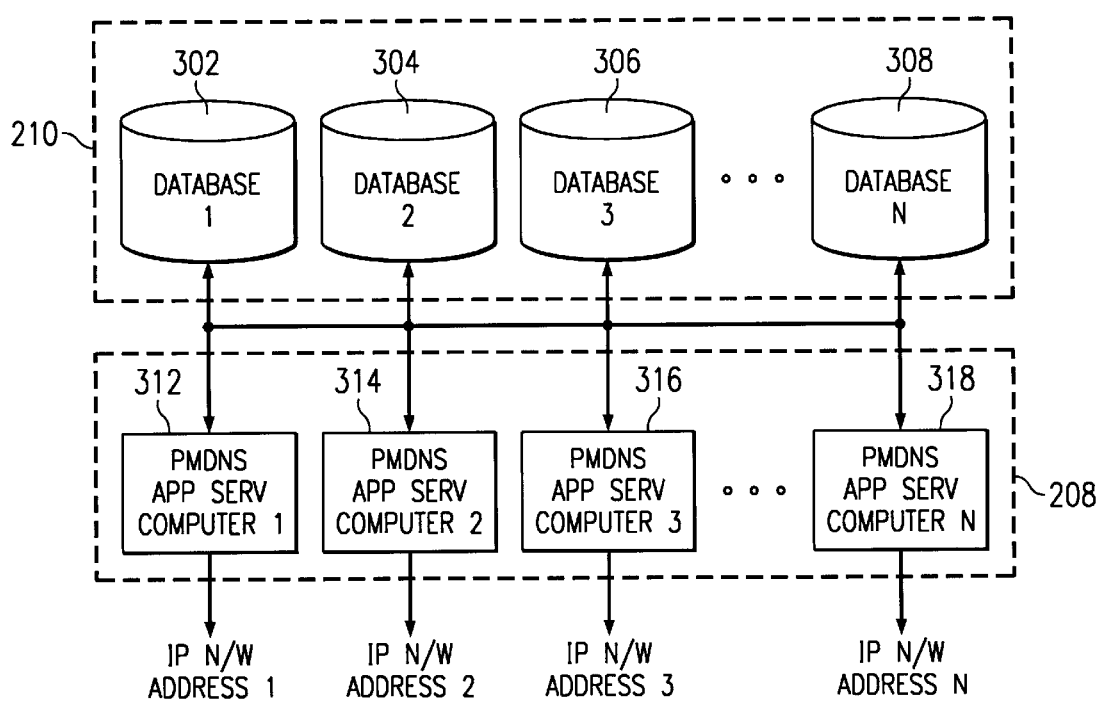
FIG. 3 illustrates a structure of a PMDNS server in which there is a plurality of separate PMDNS server application computers.

FIG. 3 illustrates a structure of a PMDNS server in which a plurality of separate PMDNS server application computers 312 through 318 implement PMDNS server application 208 and in which a plurality of separate databases 302 through 308 implement PMDNS database server 210. The plurality of PMDNS server application computers 312–318 intercouple with one another and with the plurality of databases 302–308. Such intercoupling may be via a LAN that supports Ethernet or another LAN standard, an ATM ring, or another high bandwidth interconnection which supports high speed accesses of databases 302–308 by PMDNS server application computers 312–318.

As shown in FIG. 3, the plurality of PMDNS server application computers 312–318 couple to the IP network. However, in another implementation, only one of the server computers, or a dedicated router, receives all service queries, services some of the service queries, and redirects or re-routes other service requests to other server computers. Thus, PMDNS server application 208 functions are distributed among the plurality of PMDNS server application computers 312–318, with the number of such server computers dictated by the total required processing load.

As discussed, processing operations supported by the server computers relate to the storage of, alteration to and access to TIDs that are indexed with respect to PIDs. A typical access of the PMDNS server application will be based upon a particular PID. Thus, it is appropriate to segregate processing functions among the plurality of server computers 312–318 based upon the PID included with the processing request.

One manner of segregating processing requests among the plurality of server computers 312–318 based upon PIDs is to have each PMDNS user application 204 direct its service query directly to the server computer designated to service all service requests for such PIDs. Another manner in which service queries may be segregated based upon PIDs is to designate one of the server computers as a router which receives all service queries and redirects, routes or passes to the designated server computer those service queries for which the router is not responsible.

The PMDNS database server 210 load is also segregated into the plurality of databases 302–308, each of which stores a portion of served user's information. For instance, each database may store information for a group of PIDs beginning with a specific letter, e.g., A–F, G–S or T–Z. Alternatively, each of the multiple PMDNS database servers could store information for a particular group of PIDs that begin with specific numbers, e.g., 1–2, 3–6 or 7–0. Thus, using techniques that are generally known, the database requirements of PMDNS database server 210 may be subdivided and serviced by a plurality of separate computers. Since each PMDNS server application computer 312–318 has access to each database 302–308, information requests are quickly serviced.

FIG. 4 is a table representing a plurality of user records stored in a PMDNS database server and a portion of the information stored in such user records according to the present invention. These user records include user records 412, 414, 416 and 418. Each user record is associated with a particular user of the PMDNS. A typical user of the PMDNS system uses several different types of terminals, each of which has its own address, etc., and each of which is accessible via a particular network. For example, a wireless phone has a 10-digit mobile identification number (MIN) used to access the wireless phone via the PSTN or wireless network, and a Mobile IP terminal has a 32-bit IP address used in the IP network. According to the present invention, each of user records 412–416 includes a plurality of TIDs, and a corresponding PID serves as an entry point for the user record and the associated terminals. Each of user records 412–418 also includes at least one PID 401, a password 402, a user profile 403, a historical usage table 404, a network usage profile 405, and a plurality of terminal records each of which includes a type 406, a terminal address 408 for each data type, a care-of-address (COA) 409 associated with each IP address, and a time of last use 411.

PIDs 401 identify the particular users associated with the user records and allow access to their user records. For example, tom@nortel.com is the email based PID for a user associated with user record 412. The user also has a Directory Number based PID, (972) 555-9876. With the IP network employed as the backbone, the PID may have two different formats, the email based format and the Directory Number (DN) based format. The DN based format is used to accommodate callers or personal mobility service users who do not have email access. In this manner, the existing email address or DN may be easily designated as the user's PID. For a caller communicating via a data network, the email based PID is useful. Conversely, the DN based PID can be used to accommodate callers utilizing a voice network.

Although only the DN based PID is actually employed for a PID user without email access, an email based PID may be assigned to this user internally for PMDNS architectural efficiency, similar to the case with user 414 in FIG. 4. In this case, the email based PID is known only to the network and not to the user. Even though two distinctive PID formats may be present, the email based PID is used as the first index in the user profile of the database.

Each user record also includes a password 402 that is employed to ensure that only that user may alter that user record. Further, at least one terminal record is associated with each user record, each terminal record corresponding to a user terminal. Each terminal record includes a type 406, a terminal address 408, a COA 409 (for IP addresses), and a time of last use 411. Type 406 indicates the terminal type, e.g., voice, data, roaming data (RDATA), etc. Terminal address 408 is the unique address of the associated terminal. COA 409 is an extensions affixed to an IP address which extends the unique address to a nomadic address where the terminal has been registered. Time of last use 411 indicates the last time the user used that particular terminal.

Each user record 412–418 also includes a user profile 403, a historical usage table 404, and a network usage profile 405. User profile 403 includes preferences entered by the user, which indicate the user's preferred TID(s) for specific days and/or times of day. Historical usage table 404 reflects the user's history of use and the network usage profile that is employed in determining which terminal will be used to deliver a session to that user. Network usage profile 405 indicates the probability that the user may be reached at each of the terminals contained in the record.

As shown in FIG. 4, the user associated with the email PID tom@nortel.com (i.e., user record 412) has four TIDs associated with four voice terminals: a voice terminal accessible via the PSTN at the user's workplace; a cellular terminal; a voice terminal accessible via the PSTN at the user's home; and a Voice Over Internet Protocol terminal. Upon receipt of a request to communicate with the user via voice terminal, the PMDNS returns a voice terminal address based upon network usage profile 405 and time of last use 411 information for each identified terminal.

Additionally, FIG. 4 shows four data terminals associated with the PID of user record 412: a data terminal accessible via an IP address at the user's workplace; a data terminal accessible via the PSTN at the user's home; a data terminal accessible via a cellular network; and a data terminal accessible via an IP address at the user's home. If a query is made to establish a data session with this user, the TID for one of these four terminals is returned, such determination being based upon time of last use 411 and network usage profile 405.

User record 414 contains an assigned email based PID and a DN based PID. Further, user record 414 includes three voice terminals and two data terminals. User record 416 includes both an email based PID and a DN based PID for an associated user. User record 416 also includes four voice terminal records and four data terminal records. Note that one of the data terminals is type RDATA, as opposed to the usual DATA type. Such is the case because the address of the RDATA terminal is dynamic. An example of such a data terminal is a laptop computer having a modem or network port. The laptop computer is taken with the user and, from time to time, connected to the PSTN or a network access port. When the laptop computer is coupled to the PSTN, it couples at a phone jack having a particular PSTN number. Further, when the laptop computer couples to a network access port, the network access port has a particular network address, e.g., an IP address. When such connection is made, the user may initiate a registration of the laptop computer with the PMDNS server application, identifying its current network address or PSTN number. The PMDNS database server then enters the current address in the corresponding terminal record.

User record 418 contains three voice terminal records, including one RVOICE terminal record and two data terminals. The RVOICE terminal record may be modified in the same fashion as an RDATA terminal record and may correspond to a motel room voice terminal, for example.

Figure 5:
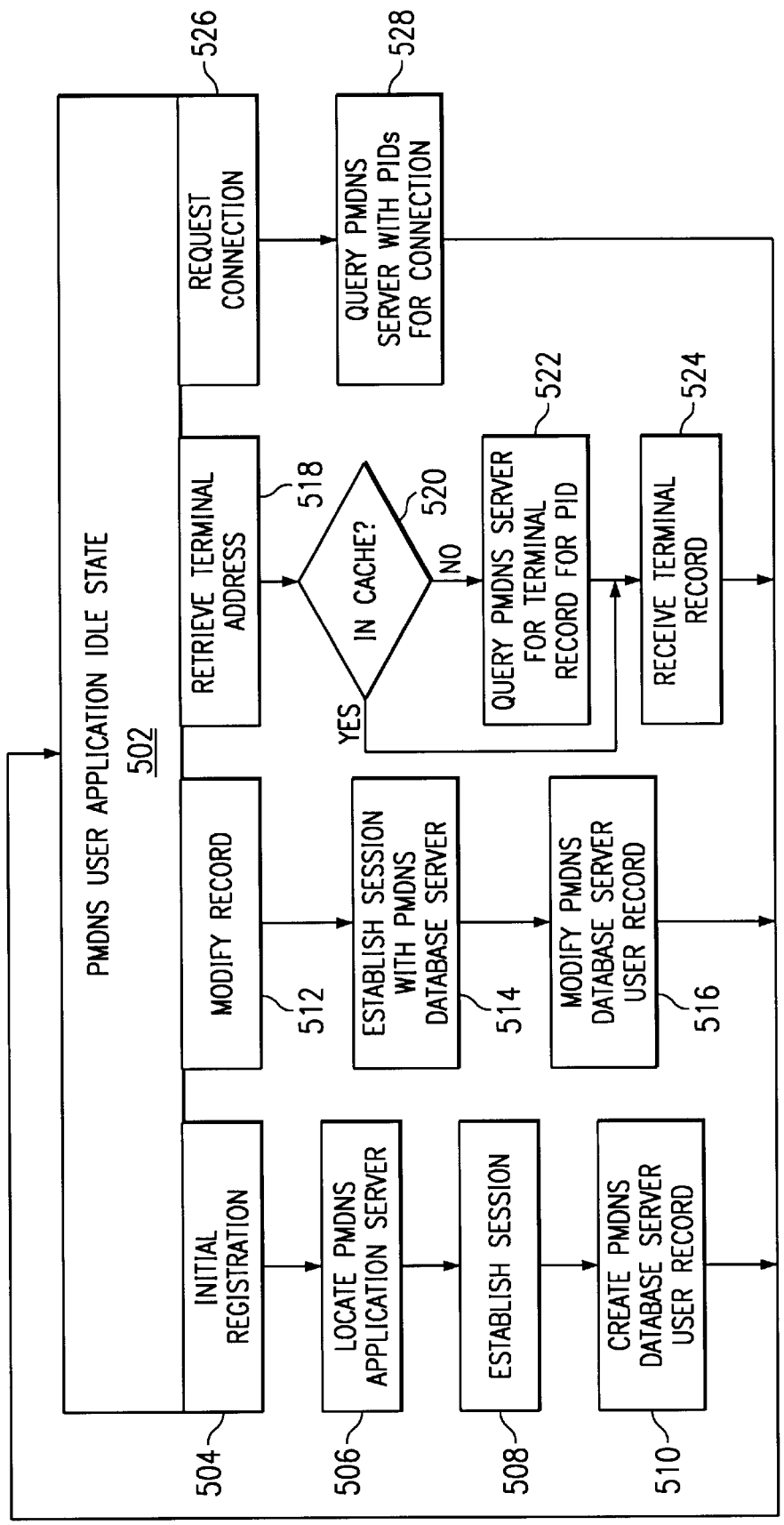
FIG. 5 is a logic diagram illustrating operation of a PMDNS user application according to the present invention.

FIG. 5 is a logic diagram illustrating operation of a PMDNS user application according to the present invention.

As was described with reference to FIG. 2, the PMDNS user application resides upon a terminal of the user, such as a computer, a data terminal, or a phone with onboard processing capability. However, the PMDNS user application may also be resident in a gateway coupling an IP network to the PSTN, for example, if the terminal of the user does not support the PMDNS user application. Such would be the case for at least some phones coupled to a PSTN that could not support the processing requirements of the PMDNS user application.

Operation of the PMDNS user application commences at step 502, where the PMDNS user application remains in an idle state until it receives an operation request. At step 504, the PMDNS user application receives a request for an initial registration of a user. Upon receipt of such request, operation proceeds to step 506, wherein the PMDNS user application locates the PMDNS server application. Once the PMDNS server application is found, the PMDNS user application establishes a session with the PMDNS server application. An interactive session between the PMDNS user application and the PMDNS server application continues at step 510 until a complete PMDNS application database user record is created for the user. From step 510, operation proceeds to step 502.

To locate the PMDNS server application at step 506, the PMDNS user application must know the address of its PMDNS server application. For the purpose of routing efficiency, a roaming mobile IP terminal or a roaming cellular phone user should be able to access a local PMDNS server application. For this purpose, the PMDNS user application should be configured with two important parameters: the address of at least one of the PMDNS server applications, PMDNS.ADDRESS; and the time to live (TTL) of the address PMDNS.TTL.

The PMDNS user application supports both manual configuration and dynamic configuration. In manual configuration, the addresses of PMDNS servers are configured manually by a user or a network administrator. In dynamic configuration, a Dynamic Host Configuration Protocol (DHCP) provides configuration parameters to Internet hosts. These configuration parameters include an allocated IP address and domain name of the user terminal, DNS IP address, router IP address, and subnet mask. The IP address of the PMDNS server can be a new parameter passed by DHCP.

Another method for locating the PMDNS server at step 506 includes using an SRV record in the DNS as an entry for the PMDNS server. Such an application requires the server administrators to add such records to the DNS entries of the server. To query an SRV record, the host either knows its own domain name or the domain name of its router (which can be acquired through DHCP or manually configured). If the domain name of the user host is known, the domain name is first to be used. Otherwise, the domain name of the router is used.

A Service Location Protocol (SLP) may also be employed to find the PMDNS server application. An SLP is an Internet protocol used to provide the locations of network services. An SLP requires a user agent (UA), a service agent (SA) and a directory agent (DA). An SA in a network server advertises its service. A DA in that network receives the advertisement and keeps the information. When a host needs to find the location of a service, a UA in the host sends a service request to the DA. The DA sends a service reply with the address of a server that provides the requested service. The addresses of DAs in a network can be provided to UAs either by DHCP or by an SRV record in the DNS. If a network supports SLP, a PMDNS server application in that network supports an SA that registers itself to a DA.

In a PSTN network or a cellular network, accesses to the PMDNS service are made through gateways, with the PMDNS user application located in the gateway. PMDNS service may be provided by several ISPs (providing the gateway), with each ISP having its own PMDNS user application (and/or PMDNS server application for the telephone network). The users in the network may subscribe to PMDNS service through different ISPs. Thus, the addresses of the PMDNS should be configured for divided user groups.

Still referring to FIG. 5, when a request is made to the PMDNS user application at step 512 to modify a user record for the user contained in the PMDNS server application, operation proceeds to step 514, where the PMDNS user application establishes a session with the PMDNS server application. Modifications to the user record are made based upon user input at step 516. From step 516, operation returns to step 502.

One parameter that may be altered in steps 512–516 is the user profile that directs communications to specific terminal (s) associated with the PID of the user. The user profile acts as a diary of its user, i.e., a schedule of which terminals/ devices upon which a user would like to be reached. The profile can be provided by the user according to the time of the day, the day of the week, and/or the date of the month. Therefore, this function provides the user with control as to when the user will use which terminal. An example of a user profile is shown in Table 1.

TABLE 1

USER PROFILE

| Terminal | From Time | To Time | Day | Date |
|---|---|---|---|---|
| Home (972) 123-1411 | 17:00 | 9:00 | — | — |
| Work (972) 321-1112 | 9:00 | 17:00 | — | — |
| Cellular (972) 213-4311 | — | — | Sat, Sun | — |

A user can change the user profile at step 516, for example, by stating that the user can be reached by email during working hours and by fax otherwise. To provide the user with control over the user profile (or other user record components), the PMDNS server application acts as a middleman by forwarding the user's requests from the user application to the PMDNS directory server.

In performing the operations of steps 512–516, two types of protocols may be involved. First, a new protocol is created to facilitate the communication between the user application and the server application. Second, LDAP is used to facilitate communication between the server application and the directory server. An example of a message format that may be passed from a PMDNS user application to a PMDNS server application is illustrated in Table 2.

TABLE 2

MESSAGE FORMAT

| Field | Description |
| --- | --- |
| Description ID | Assigned by the program that generates a request |
| Op code | Specifies the kind of message (assign, delete, query, response, etc.) |
| Resp code | Specifies the kind of response (no error, PID doesn't exist, etc.) |
| Qtype | Specifies the type of query (preference, service, etc.) |
| Reserved | Reserved for future use |
| Password | Current user password |
| Changed password | Assigned new password |
| PID length | A variable length string that described the user identification |
| PID | User personal identification |
| Op count | Number of entries in the preference section |
| Stime | Starting time of the day the user would like to be reached |
| Etime | Ending time of the day the user would like to be reached |
| Day | Day of the week the user would like to be reached |
| Date | Date of the month the user would like to be reached |
| TID length | Length in the TID field |
| TID | A variable length string that described the terminal to be reached |

Still referring to FIG. 5, at step 518, the PMDNS user application is requested to retrieve one or more TIDs. The request may be made by the user or by an application running on the user's computer shared by the PMDNS user application. For example, the user may request that an email be sent to tom@nortel.com. Although tom@nortel.com usually signifies an email address, in this case it is also a PID. Therefore, the PMDNS user application first retrieves an email address (TID) corresponding to the PID tom@nortel.com. Upon receipt of the TID, the PMDNS user application interfaces with an email program residing on the user's computer, and the email message is sent. In this example, the TID for tom@nortel.com is the same as the PID.

Alternatively, the user may direct the email program to send the email with the caveat that tom@nortel.com is a PID and not an email address. In such case, the email address interfaces with the PMDNS user application to retrieve a TID based upon the PID tom@nortel.com. Upon receipt of the TID, the email program sends the email to the TID.

From step 518, operation proceeds to step 520, wherein it is determined whether a requested TID (based upon a PID) is stored in a local cache memory of the PMDNS user application. If such is the case, the TID is sought and operation proceeds to step 524, where the TID is received. Alternatively, if the requested TID is not stored in local cache, operation proceeds to step 522, where the PMDNS user application sends a query to the PMDNS server application which includes the PID and type of TID to be returned, e.g., data or voice. The PMDNS user application then receives the TID(s) at step 524. From step 524, operation returns to step 502.

At step 526, the user may direct the PMDNS user application to establish a connection between the user and a TID corresponding to a provided PID. An example of such an operation is when a user requests that a voice call be established with another user associated with a PID. Another example of such an operation is when the user requests that a data connection be established with another user.

At step 528 then, the PMDNS user application queries the other user application or gateway for TID(s) to make the connection requested. The other user application(s) then initiate(s) setup of such communication. If the communication setup is for wireless or wireline telephone network communications, the gateway sends a setup message to the telephone network (or wireless network, as the case may be). From step 528, operation returns to step 502.

Figure 6A:
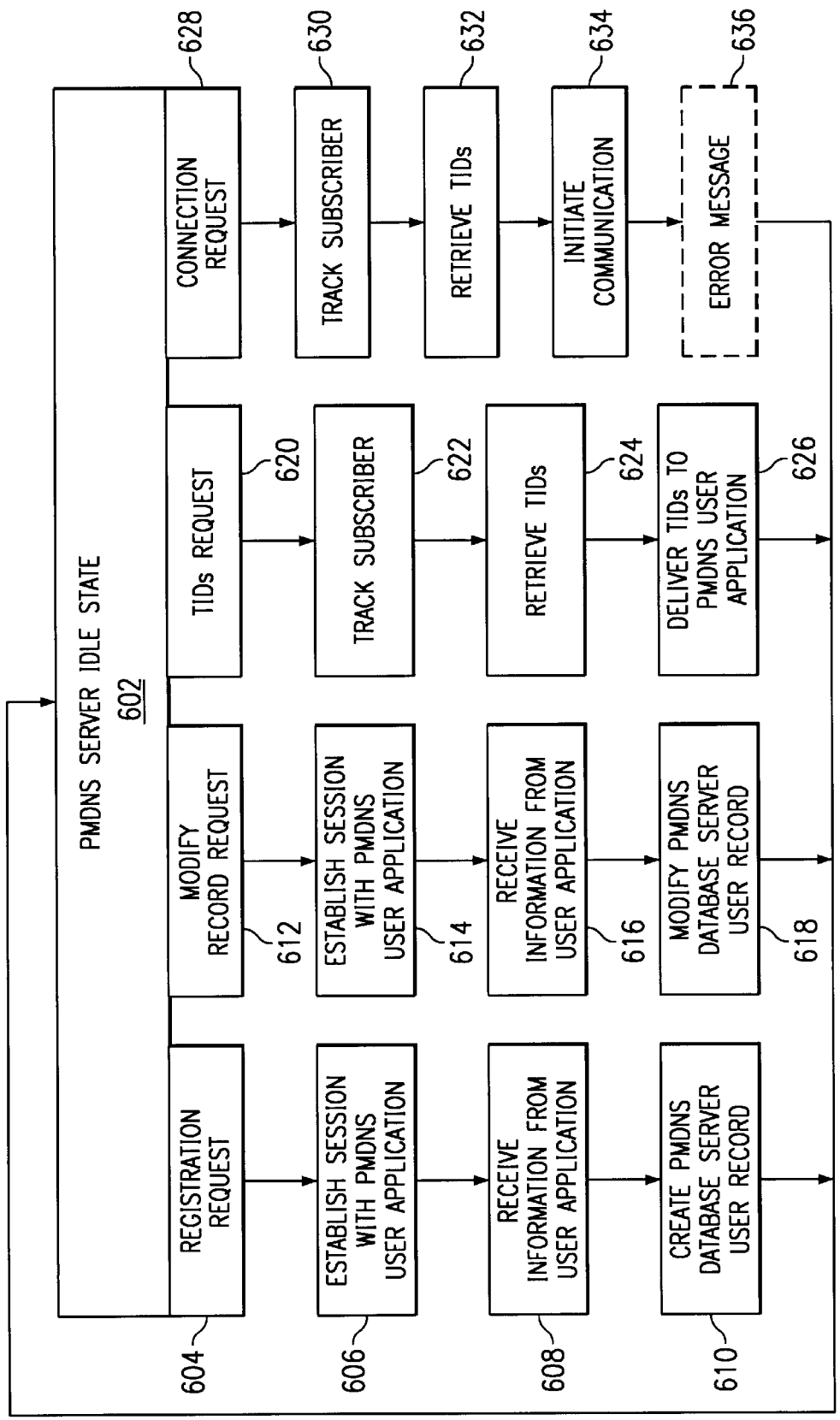
FIGS. 6A and 6B are logic diagrams illustrating operation of a PMDNS server constructed according to the present invention.
Figure 6B:
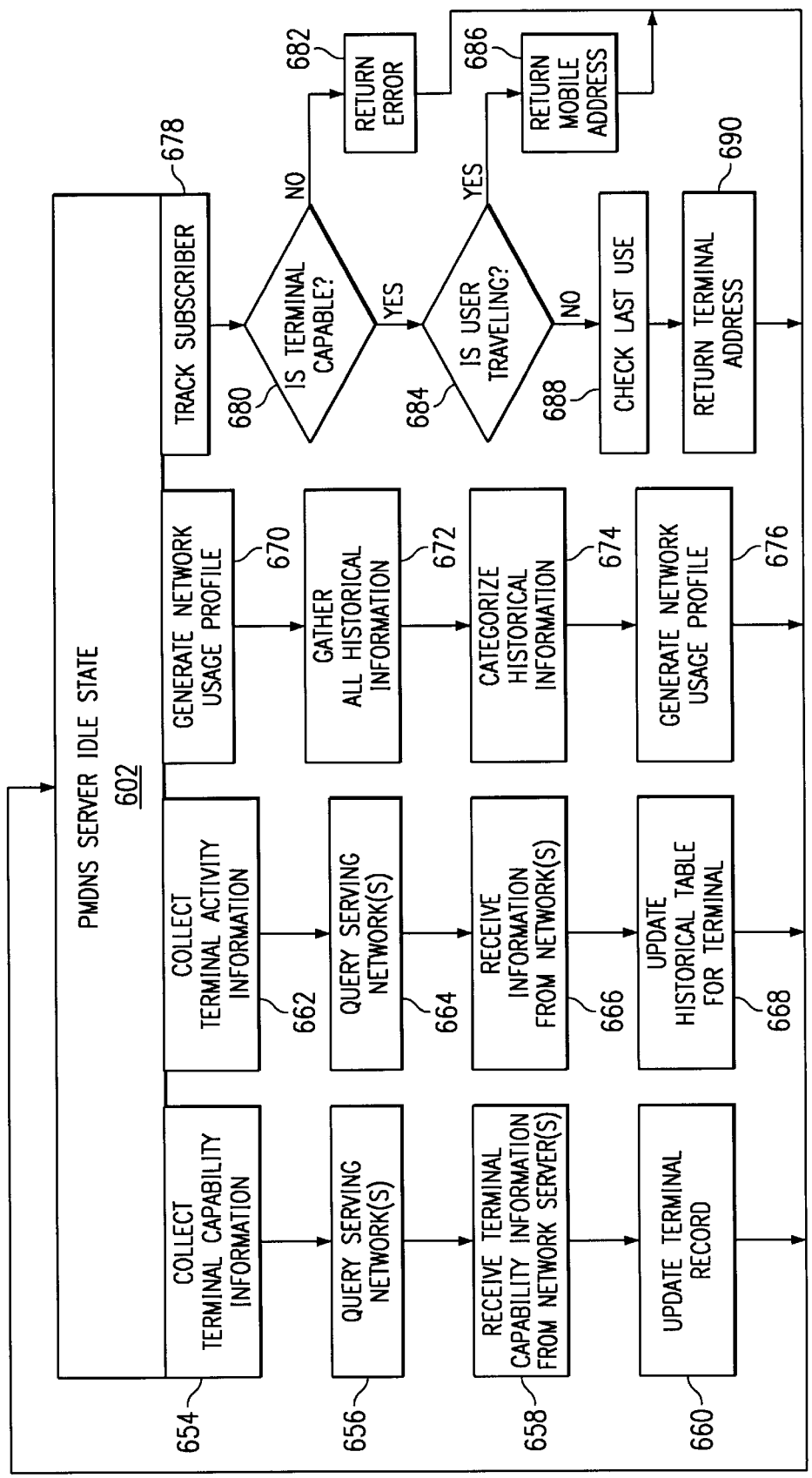

FIGS. 6A and 6B are logic diagrams illustrating operation of a PMDNS server constructed according to the present invention. Referring now to FIG. 6A, the PMDNS server application resides at an idle state 602 until an operation is requested or self-executed. At step 604, a user registration request is received, whereupon operation proceeds to step 606, where the PMDNS server application establishes a session with the requesting PMDNS user application. Once the session is established, the PMDNS server application receives information from the PMDNS user application at step 608, such information including the user's PID, associated terminals, terminal information, network usage profile, and other information regarding the user's communication capabilities and patterns. Then, at step 610, the PMDNS server application creates at least one PMDNS database application user record based upon the information received. From step 610, operation returns to step 602.

At step 612, the PMDNS server application receives a request from a PMDNS user application to modify a portion of the respective user's PMDNS database application user record. Upon receipt of the request to modify such user record, the PMDNS server application establishes a session with the PMDNS user application at step 614. Then, the PMDNS server application and the PMDNS user application interact at step 616 so that the PMDNS server application receives information from the PMDNS user application. That information is then used at step 618 to modify the PMDNS database server user record. From step 618, operation returns to step 602.

At step 620, the PMDNS server application receives a request from a user to return one or more TID(s) for a user based upon a PID. Operation proceeds to step 622, where the PMDNS server application receives the PID for the user from the PMDNS user application. In retrieving the information, the PMDNS server application tracks the user, as will further be described with reference to steps 678–690 of FIG. 6B. Operation then proceeds to step 624 where the PMDNS server application retrieves the requested TID(s) from the PMDNS database application based upon the PID, the desired service option(s), and the results from tracking the user. The TID(s) are then returned to the PMDNS user application at step 626. From step 626, operation returns to step 602.

At step 628, the PMDNS server application receives a connection request from a PMDNS user application, requesting that the PMDNS server application initiate (or cooperate in initiating) a connection between the respective user and another user of the system. At step 630, the PMDNS server application tracks the user (as will further be described with reference to steps 678–690 of FIG. 6B). At step 632, based upon the tracking at step 630, the PMDNS server application retrieves TID(s) for the user. Then, at step 634, the PMDNS server application initiates the communication (voice, data or multimedia) between the user and one or more other users identified by the received PID(s).

In initiating the communication, the PMDNS server interfaces with another application that actually sets up the communication. For example, the PMDNS server may interface with a telephone switch for initiating a voice communication, a voice over internet program, an email application, a video conferencing application, or such other communication that is designed to set up communications between users. If an error in communication setup results, the PMDNS server application sends an error message to the requesting PMDNS user application at step 636. From step 636, operation returns to step 602.

Referring now to FIG. 6B, from the idle state 602, the PMDNS server application may initiate (or be directed to initiate via timer expiration or PMDNS user application request) the collection of terminal capability information at step 654. Terminal capability represents the physical limitations of the terminal. For instance, a plain old telephone service (POTS) telephone is only capable of making/receiving voice calls. Terminal capability is static information. It can be generated by PMDNS service providers or may be provided by the user via the PMDNS user application.

In one operation, the PMDNS server application queries the serving network(s) for a terminal whose capabilities are sought at step 656. The serving network may retrieve the terminal's capabilities from a database or may query the terminal for its capabilities. In either case, the serving network(s) return(s) the information to the PMDNS server application at step 658. At step 660, the PMDNS server application updates the corresponding user records in the PMDNS database application according to the capabilities reported. From step 660, operation returns to step 602.

At step 662, the PMDNS server application collects terminal activity information. Such activity information may be periodically collected; collection may be initiated via the PMDNS user application; or collection may be implemented when another trigger is met. To track a user's current TID, the PMDNS server application must attempt to gather all possible information about the terminal and analyze it intelligently. Such useful information includes the last active terminal address and time, the terminal network usage profile (time, day and frequency), and the current time.

A subscriber's current terminal network usage profile is difficult to obtain. However, a user's recent terminal network usage profile may be obtained by collecting historical usage of the terminal from the networks in which the terminal operates. Thus, at step 664, the PMDNS server application queries the network(s) that service(s) the subject terminal. Information is received at step 666, and an updated historical usage table for the terminal is created at step 668. From step 668 operation returns to step 602. Steps 662 through 668 may be repeated for each terminal that services a particular user.

The information collected in steps 662–668, as well as previously collected information, may be used to generate a network usage profile for the user. The initiation of creation of the network usage profile starts at step 670. From step 670, all historical information for the terminal is gathered at step 672. At step 674, this information is categorized into the relevant categories. Finally, at step 676, the historical usage information is used to generate a network usage profile for the user.

The PMDNS server application accumulates historical usage data in a historical usage table based upon a user's access history. Receipt of a query from a user by a PMDNS server application indicates that the user is currently active. When the PMDNS server application receives a query from a PMDNS user application, it obtains knowledge about the TID(s) associated with the user's PID. Therefore, while the PMDNS server application requests the necessary information from the PMDNS directory server, the PMDNS server application also updates the last activity and historical usage tables of the calling user's PID on the PMDNS directory server. When updating the historical usage tables, the PMDNS server application merely adds one more activity to the counter under the currently used terminal (for the user) at the current time.

Network usage profiles are created periodically by the PMDNS directory server based on the user's historical usage tables, which record the usage of terminals associated with a PID during a designated time period. For instance, the PMDNS server application may accumulate a record of the usage of different terminals of a PID in historical usage tables for a week at steps 662 through 668. At the end of the week, the PMDNS server creates a network usage profile for a user using the historical usage tables, and then begins to accumulate historical usage data for the coming week at steps 670 through 676. Thus, network usage profiles indicate the usage profile of the previous week.

A number of terminals associated with a PID may reside at the same location. For example, a user's computer and phone at work are usually located in the user's office (probably on the same desk). When a user can be reached at the work computer, most likely the user can be reached via the phone at work. Therefore, in collecting statistics, terminal addresses associated with PIDs may be grouped based on their location.

In most cases, terminals are categorized into "home," "office" or "mobile" groups. A "mobile" group usually contains only one terminal because it is very rare that two mobile terminals are co-located all the time. If a user has more than one mobile terminal, then these mobile terminals should be placed in different groups (e.g., mobile, mobile2, etc.). Similarly, if a user has more than one home and/or office, then that user's PID should have groups called "home1," "home2," "office1," "office2," etc.

A user has different network usage profiles for different days (e.g., weekdays versus weekends) and for different terminal types. The PMDNS server application(s) accumulate PID terminal usage data in different historical usage tables during a certain time period (e.g., a week). Table 3 below illustrates the accumulation of historical usage data in a historical usage table for a particular user.

TABLE 3

HISTORICAL USAGE TABLE

| Location | , , , | 7–8 a.m. | 8–9 a.m. | 9–10 a.m. | 10–11 a.m. | , , , |
|---|---|---|---|---|---|---|
| Home | , , , | 29 | 5 | 3 | 1 | , , , |
| Work | , , , | 3 | 7 | 30 | 38 | , , , |
| Mobile | , , , | 8 | 22 | 8 | 4 | , , , |

The information contained within Table 3 represents the data collected for a specific time period. The numbers in the table indicate the terminal usage at different locations during different time intervals. For instance, the number 30 in the third row, fifth column indicates that the user has used terminals at work 30 times during the time interval from 9 a.m. to 10 a.m.

At the end of an accumulation time period (e.g., at the end of a week), the PMDNS server application stops accumulating terminal usage data in the historical usage table, and this table is ready for use in creating a new network usage profile for the user. That is to say, the end of one accumulation time period is the beginning of the next accumulation time period for new historical usage data, when the PMDNS server application starts to accumulate historical usage tables for the new accumulation time period.

Table 4 is an example of a completed historical usage table that is based upon the information contained in Table 3. Similar to Table 3, each entry in Table 4 indicates the number of times the user used terminals at a particular location during a specified time interval of a day during a certain length of time (e.g., a week).

TABLE 4

COMPLETED HISTORICAL USAGE TABLE

| Location | , , , | 7–8 a.m. | 8–9 a.m. | 9–10 a.m. | 10–11 a.m. | , , , |
|---|---|---|---|---|---|---|
| Home | , , , | 32 | 10 | 4 | 2 | , , , |
| Work | , , , | 4 | 10 | 35 | 43 | , , , |
| Mobile | , , , | 12 | 30 | 10 | 5 | , , , |

A network usage profile indicates the probabilities that a user can be reached at terminals in certain locations during different time intervals. There are two types of network usage profiles: profiles for weekdays, and profiles for weekends.

Given a user historical usage table, creating a network usage profile is straightforward. The probability that the user can be reached at a given terminal at a particular time interval is equal to the number of calls at that location in that time interval divided by the total number of calls in that time interval. In other words, the entry value in a cell in a user's network usage profile is equal to the value in the (relatively) same cell position (in terms of row and column) in the historical usage table divided by the summation of all entry values in that column. The mathematical formula for computing the probability in the entries of network usage profiles is illustrated in Equation 1 as:

$$\text{prob}(location, timeInterval) = \frac{\sum_{t \in location} \text{count}(t, timeInterval)}{\sum_{\forall loc} \sum_{d \in loc} \text{count}(d, timeInterval)}, \quad \text{Equation (1)}$$

where "∀ loc" means for all locations under the PID.

Table 5 is an example network usage profile generated for the example user in Table 4. For instance, the probability (67%) appearing in the second row, third column in Table 5 is equal to the entry value (32) in the second row, third column in Table 4 divided by the summation of all values (32+4+12=48) in the third column in Table 4.

TABLE 5

NETWORK USAGE PROFILE

| Location | , , , | 7–8 a.m. | 8–9 a.m. | 9–10 a.m. | 10–11 a.m. | , , , |
|---|---|---|---|---|---|---|
| Home | , , , | 67% | 20% | 8% | 4% | , , , |
| Work | , , , | 8% | 20% | 71% | 86% | , , , |
| Mobile | , , , | 25% | 60% | 21% | 10% | , , , |

Network usage profiles may not be accurately predicted for future usage because they are based on previous terminal usage behavior of the user. Even a terminal network usage profile provided by the user personally might not precisely predict the user's location due to random factors of mobility and nomadicity. To achieve the best performance of a PMDNS, an intelligent tracking algorithm is needed to compensate for the inaccuracy of network usage profiles.

Returning to FIG. 6B at step 678, the PMDNS server application initiates tracking of a user. Tracking is the PMDNS server application activity that returns at least one TID based upon a PID received from the PMDNS user application. At step 680, before attempting to determine the terminal at which the called user can most probably be reached, the PMDNS server application checks whether the called user has any terminals capable of establishing the connection. If there are capable terminals under the user's PID, the PMDNS server application begins the efforts to track the user. Otherwise, the PMDNS server application returns an error message, returning the called user's terminal to the PMDNS user application at step 682. From step 682, operation returns to step 602.

If the called user has terminals capable of establishing the connection, as determined at step 680, the PMDNS server application determines whether the user associated with the PID is traveling. In doing this, the PMDNS server application first determines whether the user has a mobile phone. If the user has a mobile phone, the PMDNS server application interfaces with a home location register (HLR) of the wireless communication system servicing the mobile unit. In interfacing with the HLR, the PMDNS server application investigates the HLR information stored in the PMDNS database server to determine whether the mobile terminal is currently being serviced within its home area. This HLR access may be performed upon demand or, alternatively, may be performed periodically by the PMDNS server application for all mobile units being served.

Such a determination may be made based upon whether or not the mobile unit's "home" visitor location register (VLR) currently provides its service. This information is available in the HLR. If the mobile unit is not currently being served by its home VLR, the PMDNS server application determines at step 684 that the user is traveling and proceeds with its operation to step 686. At step 686, the PMDNS server application returns a TID by invoking function "outOfTown (connectionType)" because the user is most likely out of town. The outOfTown function returns a TID that assumes the user is traveling, e.g., a TID for a cellular phone or a TID for a laptop computer.

If the PID user record has no mobile phone listed, or if a listed mobile phone is in its home VLR as determined at step 684, then the PMDNS server application checks the last activity for the user record (by checking the time of last use 411 for each available terminal) at step 688. If the time that has passed since the last use is longer than H_thresh minutes ago (e.g., H_thresh=1440 minutes=24 hours), then the last activity does not provide much information about TIDs at which the user can be reached. Therefore, the PMDNS server application returns TIDs by checking the network usage profile (i.e., by invoking function "checkUsageProfile") at step 690.

If the time that has passed since last usage is less than M_thresh minutes ago (e.g., M_thresh=5 minutes), then the PMDNS server application returns the last active terminal address as the TID to be reached for the PID at step 690. In this case, the user used that terminal very recently, so it is very likely that the user is still in the vicinity of that terminal and most likely to be reached at the last active terminal address. If the time since the last activity is x minutes ago, with H_thresh<x<M_thresh, then the PMDNS server application examines how the last activity fits the user's network usage profile. Based upon this determination, the PMDNS server returns a TID for the terminal where the user is most likely to be reached. From either step 686 or step 690, operation returns to step 602.

Referring again to FIG. 1, various examples of operation according to the present invention are presented. In a first example, the calling user initiates operation at phone 124 coupled to PSTN 109 and desires to communicate with a called user (PID=calleduser@loc). In the example, a PMDNS user application is located at gateway 110 since phone 124 of the calling user does not support local function of the PMDNS user application. The calling user dials an outgoing PID number (corresponding to the called user), and PSTN 109 infrastructure routes the call to gateway 110. Gateway 110 verifies that the calling user is subscribed to the PMDNS service and sends a query with the launched PID to PMDNS server application 150 via IP network 102.

PMDNS server application 150 accesses the PMDNS database server to find the current TID of the called user. The PMDNS server application then returns the TID that corresponds to cellular phone 132 to the PMDNS user application. Alternatively, the PMDNS server application initiates a call between phone 124 of the calling user and cellular terminal 132 of the called user.

In a second example, the calling user is at terminal 126 and has subscribed to the PMDNS service via ISP X. The caller wants to make a call to Bob and starts the locally installed PMDNS user application with Bob's PID bob@number1.com. The caller also specifies preference for an H.323 call (Internet Telephony) to Bob. The PMDNS user application then queries the PMDNS server application with Bob's PID. The server replies with two ordered TID address groups for Bob. One group includes Bob's cellular phone 132 number, (972) 123-4567; and the gateway of cellular network 114. The second group includes Bob's home phone number, (972) 765-4321; and the address of its associated gateway. (Bob's home phone is a group ID which Bob shares with his family, and the number is usually given less priority unless PMDNS is very sure Bob is more likely to be reached at that address than other addresses). PMDNS server 150 also instructs that the two numbers should be tried in sequence.

The PMDNS user application first starts an H.323 session to gateway 114 of Bob's mobile phone. Gateway 114 then converts the H.323 call to a POTS call and rings Bob's mobile phone 132. If Bob does not answer, then Bob's home phone 124 is tried.

In yet another example, the calling user originates a call from phone 124. The caller dials Bob's DN type PID, e.g., prefix+(972) 987-6543. PSTN 109 collects the dialed number and recognizes it as an outgoing call to the PMDNS. The call is routed to gateway 110, and gateway 110 verifies that the caller is a user of the PMDNS service and sends a query with the dialed number to PMDNS server application 150. PMDNS server application 150 finds that the current TID of the called user is bob@number1.com. This TID is returned to gatekeeper 152 along with sufficient termination information to allow gatekeeper 152 to set up an H.323 call between phone terminal 124 and the TID returned.

Referring again to FIG. 2, additional description is provided. When a PID is dialed by a user of the PMDNS user application, the PMDNS user application sends a query to the PMDNS server application. The PID is merely an index grouping the TIDs of multiple terminals used by the user. The query sent to the PMDNS server application and its corresponding response are based upon DNS information flow, with no changes made. The message format is also DNS based, but has to go through some changes, with certain fields having new values assigned to accommodate the personal mobility service.

The query directed to the PMDNS database server includes three pieces of information: the launched email based PID, the dialing TID, and the session characteristics. The launched PID is used as an index to search the database. If a DN based PID is dialed, a query to a translation database (not shown in FIG. 2) is made first, to determine the corresponding email based PID before searching the PMDNS database server. It is assumed that the actual message can be overwritten on the way from the translation database to the PMDNS database, this approach being proposed in favor of having query/response between user and translation database and PMDNS database.

The caller's dialing TID is included to identify the caller. If the caller is a PID service user and the terminal being used is a user's PMDNS terminal, then this information can be utilized to update the caller's network usage profile, thus influencing future decisions as to which terminal should be used to reach this user. Conversely, the network usage profile of the called user is difficult to monitor in this fashion. Although a selected TID is used to set up a session, it is not known which terminal is ultimately reached, and it is not known whether the called user's terminal actually answers the call. Additionally, there is the possibility that the terminal may be answered by an answering service rather than the user.

The session characteristic is used to indicate the nature of the incoming session, i.e., voice, data or multimedia. The session characteristic is needed because the compatibility of terminal capabilities influences the TID selection. For instance, although not shown, TID selection is a result of the logical AND of the originating terminal's capability and its requested session. Possibly, it is achieved via some local negotiation at the originating terminal through the applications supporting personal mobility.

In response, the PMDNS directory server returns two pieces of information: the gateway IP address, and the selected TID. The gateway IP address is used to establish the connection from the gateway to the terminating access switch (versus from the application to the IP terminal); and the TID is used to establish the connection from the terminating access switch to the terminal selected to reach the user.

To accommodate the PMDNS query and response process, several changes are made in an existing DNS message format. Each DNS message begins with a fixed Header Section that contains a unique 2-byte ID field that the user uses to match responses to queries, and a 2-byte parameter field specifying the operation requested and a response code. The field labeled XXCOUNT gives a count of entries in the corresponding sections that occur later in the message. For example, the field labeled QDCOUNT gives the count of entries that appear in the Question Section of the message.

In a DNS message, each of the Answer Section, Authority Section, and Additional Information Section consists of a set of resource records (RRs) that describe names and mappings. Each RR describes one name.

For PID query/response, the same sections will be followed as in the DNS message format. The few changes made in extending new values in certain fields are itemized in Table 6 (below). The fields in the Header Section are identified, with its meaning in the existing DNS and its extension under PMDNS. The key extension here is to open the reserved OPCODE field and use value 3 to indicate a PID query. This is necessary because the PID query would have a different format in QNAME field in the Question Section than its original counterpart used in DNS. For example, a QNAME in DNS may be tom@nortel.com, yet a QNAME in PMDNS may be (972) 684-0800. Realizing this is a PID query would prevent it from being discarded as having name error.

When a user travels from one place to another, the user may notify the PMDNS server of unexpected deviations in

TABLE 6

HEADER SECTION OF DNS MESSAGE FORMAT

| FIELD | EXISTING DNS | PMDNS EXTENSION |
|---|---|---|
| ID | assigned by query originator and copied into response; used by the requester to match up replies to outstanding queries | |
| QR | specifies whether this message is a query (0) or a response (1) | |
| OPCODE | specifies kind of query in this message; set by the query originator and copies into the response; possible values:<br>0      a standard query<br>1      an inverse query<br>2      a server status request<br>3–15  reserved for future use | open '3' for PID query |
| AA | authoritative answer; valid in responses, indicating the responding name serve is an authority for the domain name in question section | applicable not only to domain name query, but also to PID query |
| TC | truncation allowed; specifies the message was truncated due to length greater than that permitted on the transmission channel | |
| RD | recursion desired; set in a query and copied into response the name server | |
| RA | recursion available; set or cleared in a response; denotes if recursive query support is available in the name server | |
| Z | reserved for future use; set to zero in all queries and responses | |
| RCODE | response code; possible values:<br>0      no error condition<br>1      format error<br>2      server failure<br>3      name error<br>4      not implemented<br>5      refused<br>6–15  reserved for future use | |
| QDCOUNT | # of entries in Question Section | |
| ANCOUNT | # of RRs in Answer Section | |
| NSCOUNT | # of name server RRs in Authority Records Section | |
| ARCOUNT | # of RRs in Additional Records Section | |

Maintaining user mobility across a plurality of interconnected heterogeneous networks utilized by a PMDNS becomes more difficult when the user moves a node from network to network. The PMDNS system as described thus far relies on the PMDNS directory server to maintain accurate information as to a node's location. If the node moves from network to network, the address for that node within the PMDNS database server becomes invalid.

In most computing communication applications, the address of a mobile node is available to the PMDNS server application at registration. This address can then be used as the TID of the mobile node. However, for user terminals supporting PMDNS user applications, the terminal address is valid until interrupted periods of nomadic computing. The present invention facilitates nomadic computing by maintaining the terminal address or TID of the PMDNS user application throughout the nomadic wandering of the user from network port to network port. Only the mobile node extension is added. Therefore, the present invention allows for nomadic computing while maintaining all of the advantages of the PMDNS. The PMDNS is unaffected, except for the updating of the TID with the IP address of the network.

the user selected preferences by de-registering from the current IP address. The PMDNS server is then forced to analyze usage records for the most appropriate TID for the user's PID. After the user physically connects to a new network port, the user registers with the PMDNS server at an IP port for computing communications, and the PMDNS binds the present IP address to the IP address of the user terminal. The PMDNS server application uses the user's terminal personalization, together with the usage profile and session characteristics, to map a party's identifier to a terminal's identifier. This information is returned by the PMDNS directory server to the access network for setup of the communications. In this way, the IP address of the user's current location is used in concert with the terminal's identifier to route incoming computing communications connection requests to the current location of the user.

Figure 7:
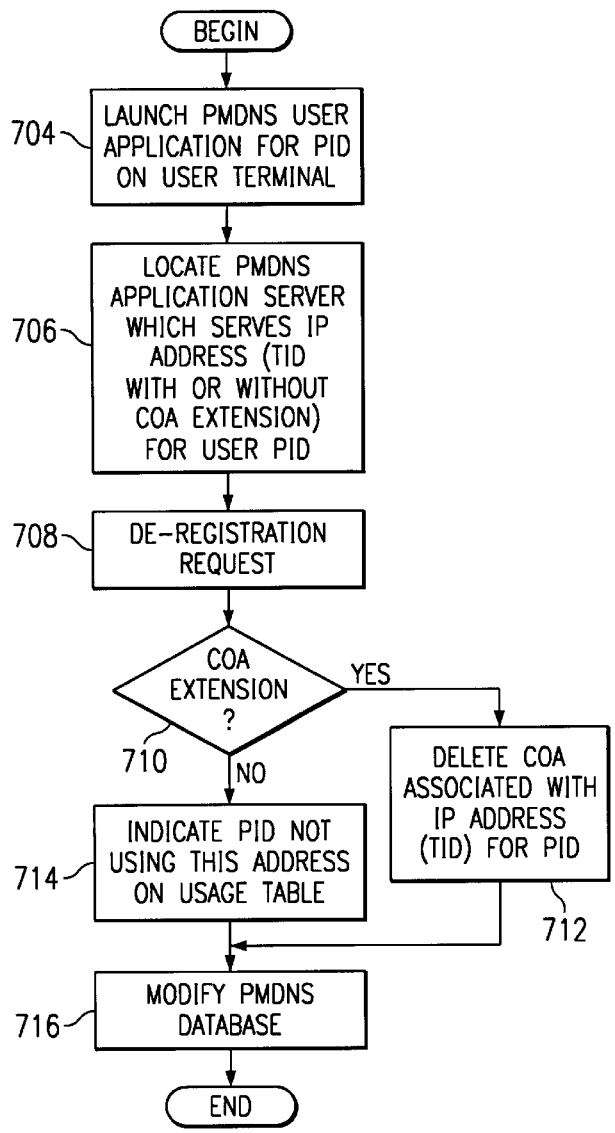
FIG. 7 is a diagram illustrating the de-registration sequence of the present invention.

FIG. 7 illustrates the de-registration sequence of the present invention. As noted above, one of the problems in supporting completely nomadic computing is the user's inability to know precisely where the user application terminal will be connected. However, once the user has determined that the PMDNS user application must be removed from the current IP address, the user may de-register the application from that TID. This process begins when the user launches the PMDNS user application for the PID on the user terminal (step 704). The PMDNS user application locates the PMDNS server application that serves that IP address for that user or for that PID. The IP address may be a local IP address of the user terminal; or the TID may instead have a care of address (COA) extension for that IP address, in which case the PMDNS user application is being used nomadically away from the TID normally associated with that PMDNS user application.

Once a PMDNS server application has been located, a de-registration request is made to the server application (step 708). At that point, the PMDNS server application examines the TID of the PMDNS user application requesting a COA extension. If the TID associated with the user application has a COA, the COA is deleted (step 712). Subsequent to deletion of the COA extension of the TID, incoming connection requests are no longer routed to the COA IP address. Instead, the sequence flows as depicted above with respect to FIG. 6A, starting at step 628.

On the other hand, if no COA extension exists for the TID IP address, the PMDNS server application indicates that the PID is not being used at the IP address being de-registered. In either case, the step of de-registering the IP address indicates to the PMDNS server application that there is an extremely low probability that the user will be found at the de-registered IP address. This information is then used to modify the PMDNS database (step 716).

As noted above, one of the problems with supporting completely nomadic computing is the user's inability to know precisely where the user application terminal will be connected. Another problem is that the user usually does not know the IP address prior to making a connection with a new IP address. Therefore, not only is it virtually impossible for the user to reset user profile 403 (FIG. 4) for the new IP address; but also, a PMDNS server application administrator is unable to reset the terminal identifier or allocate a new network usage profile 405 until after the user has physically connected the terminal to the new connection port.

Figure 8:
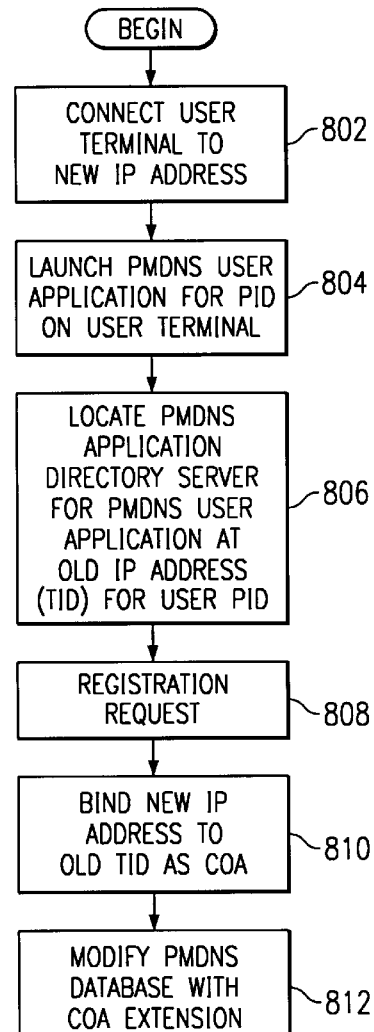
FIG. 8 illustrates the nomadic computing process initiated by the user registering the user terminal at a new IP address.

FIG. 8 illustrates the nomadic computing process initiated by a user registering a user terminal at a new IP address. The process of FIG. 8 begins when the user physically connects the terminal to a new connection having a different IP address from that of the TID of the user application (step 802). The user then launches the PMDNS user application for the PID on the user terminal (step 804). Rather than attempting to locate a local PMDNS server application, as is the case when using a mobile IP address, here the PMDNS user application locates its own PMDNS server application for the IP address for which it was originally configured (step 806). The registration request is then made to the PMDNS server application (step 804).

The PMDNS server application finds the IP address associated with the network in which the user terminal is now connected to the TID as a COA (step 808). The act of binding the COA to the TID can be performed by adding the current address of the terminal to the TID as an extension. Thus, whenever a connection is called for using the TID, the COA is used in place of the TID, thereby making connection to the user terminal in its new location rather than attempting to locate it at the TID of the old location.

Finally, the PMDNS server application modifies the PMDNS database with the COA extension (step 810). As noted above, the COA can be an extension to the TID and can thus be incorporated into the TID statement. Alternatively, the COA can be a separate column in the PMDNS database, as depicted in FIG. 4 as care of address 409. In practice, COAs are powerful tools that function much like user profiles or historical usage tables in that a COA routes incoming connection requests to the most likely location of the user.

FIGS. 9A and 9B illustrate a typical connection sequence as seen from the perspective of the PMDNS server application. At some point, the PMDNS server application receives a PMDNS user application connection request (step 912). The PMDNS server application analyzes the incoming session characteristics to determine the media type(s) (i.e., voice, data, multimedia or some combination thereof) at step 914. The PMDNS server application then tracks the subscriber (step 916). When the subscriber PID is located, the PMDNS server application checks the TIDs associated with the subscriber PID for any COAs (step 918). An active care of address indicates nomadic use of the user terminal. However, the existence of a COA is not determinate. Once a COA is detected, the PMDNS server application checks to see if the COA was used last (step 920) by examining time 411 associated with COA extension 409, and by checking all other times associated with that user record as well. If the COA is currently being used by the user, i.e., the COA address was the last terminal used, then the COA is identified as a current location address (step 922).

However, it may be possible that the user has simply failed to de-register the COA, in which case the user may actually have last used another user application at another IP address, such as a home terminal. Therefore, the current location of the subscriber is determined by reference to the usage tables, as described above with respect to FIG. 6 (step 924), rather than by assumption that the COA is the current user location.

Once the subscriber's location is determined, the subscriber's current terminal characteristics must be compared to that of the incoming session (step 926). If the media type of the incoming session does not match the subscriber terminal's characteristics, then the PMDNS server application must evaluate the types of terminals available to the user at the current location.

In a simple example, if the subscriber's work IP address contains a COA extension, it cannot be assumed that the user is available at the user's work or home PSTN for voice media. The PMDNS server application prioritizes a mobile voice media terminal, such as a cellular phone, over the work or home PSTNs. In any case, the PMDNS server application matches the incoming session characteristics with that of one or more terminals associated with the subscriber's PID.

Alternatively, if the subscriber's terminal characteristics match the incoming session, the PMDNS server application skips step 928 and moves directly to step 930, where the PMDNS server application updates the subscriber usage statistics. Once the terminal(s) with the proper characteristics has been determined for the session, the PMDNS server application returns the matching subscriber TID(s) to the user application (step 932). Using that data, the PMDNS server application establishes a session directly between the user application terminal and the subscriber terminal (step 934).

The system support provided by PMDNS for nomadic computing can best be illustrated by example. Referring again to FIGS. 1 and 4, and assuming that Tom leaves Dallas and travels to Ottawa on a business trip, consider the following sequence of events. Tom travels from Dallas to Ottawa with his laptop. Upon arriving in Ottawa, Tom is directed by Mary to use her IP port connection on LAN/ WAN 104. Tom then plugs his laptop in Mary's jack at the Ottawa location. Tom registers himself at Mary's IP port using his own laptop by launching the PMDNS user application associated with his terminal which in turn locates a local PMDNS server application 150 located somewhere on the IP Network 102. The PMDNS server application uses Tom's PID to locate to locate the PMDNS server application directory (not shown) for Tom's PID and TID. The PMDNS server application the binds the new location IP address from which Tom is now connected, to the TID of Tom's terminal. Mary's IP address is now the care-of-address for Tom's laptop terminal. Mary's IP address being 47.345.12.7 is now affixed to Tom's laptop terminal address or TID, 24.112.3.76. The resulting address for Tom's laptop will be look like 24.112.3.76:47.345.12.7. Once done, any subscriber attempt to connect to Tom's terminal user application TID, 24.112.3.76, will be automatically and transparently routed to Tom's new IP address 47.345.12.7, located in Ottawa.

For instance, a subscriber, Cindy, attempting to communicate with Tom would launch Tom's PID, tom@nortel.com. As discusses with respect to the examples above, Cindy would select the media options she intends to communicate through, for instance she selects voice and file transfer options. A PMDNS server (150 or any other local PMDNS server) then receives Cindy's query for service and analyzes Cindy's incoming session characteristics to be voice and data.

At this point, in the first embodiment of the present invention the PMNDS server would merely check for a COA extension, such as the xx.xx.xx.xx:yy.yy.yy.yy, TID:COA format, to a terminal TID. If a COA were present, the PMDNS would default to that location's IP address unless another terminal IP address had been used more recently. The PMDNS server would dispense with the analyzing user profile usage and assume that Tom had made an unexpected deviation from his pre-planned routine in his user preferences. In other words, the PMDNS server would assume Tom's terminal was nomadic and located at the COA IP address location, 47.345.12.7.

In another preferred embodiment, the PMDNS would first check the personal user profile 403 of FIG. 4. Assuming the personal profile indicated that Tom's preferred data communication device was the laptop at that particular time of day, connection would automatically be routed to Mary's IP address in Ottawa. The PMDNS would then check Tom's usage pattern, usage table 404 and last time used 411, for any terminals used subsequent to Tom's terminal usage at Ottawa. If none are found, the PMDNS server matches Tom's available terminals' capability 406 with the incoming session characteristics of voice and data, updates Tom's usage statistics and selects Tom's mobile phone and laptop as the proper terminals for Cindy's incoming session. The PMNDS then returns Tom's mobile phone number and IP address of Mary's PC, 47.345.12.7, which is the care-of-address extension to Tom's laptop TID.

At that time Cindy opens and sends the desired file, and then simultaneously hears Tom's mobile phone ringing. Tom receives file arrival alert at his laptop and then he opens the file and simultaneously hears his mobile phone ring.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A personal mobility system for nomadic computing, wherein the personal mobility system determines a terminal address based on a personal identifier of the nomadic user, the personal mobility system comprising:

a network server;

a memory contained within the network server;

a user database stored in the memory within the network server, wherein the user database indexes a plurality of users by each user's personal identifier, the user database further indexes a plurality of terminal identifiers to at leas; one personal identifier;

the user database further indexes a nomadic terminal identifier to at least one terminal identifier; and an access port for accessing the network server for recovering the nomadic terminal identifier associated with the user, wherein the user database further comprises a network usage profile for the user, wherein recovering the nomadic terminal identifier associated with the user is performed in alter of traversing the network usage profile for the user.

2. The personal mobility system of claim 1, wherein the nomadic terminal identifier is bound to one of the plurality of terminal identifiers indexed to at least one personal identifier.

3. The personal mobility system of claim 1, wherein the personal mobility system serves a plurality of heterogeneous networks selected from the group consisting of Internet Protocol networks, Public Switched Telephone Networks, cellular wireless networks, wireless satellite networks, local area networks, and wide area networks.

4. A personal mobility system for nomadic computing, wherein the personal mobility system determines a terminal address based on a personal identifier of the nomadic user, the personal mobility system comprising:

a network server;

a memory contained within the network server;

a user database stored in the memory within tho network server, wherein the user database indexes a plurality of users by each user's personal identifier;

the user database further indexes a plurality of terminal identifiers to at least one personal identifier;

the user database further indexes a nomadic terminal identifier to at least one terminal identifier; and an access port for accessing the network server for recovering the nomadic terminal identifier associated with the user, wherein the user record further comprises a historical usage table for the user, wherein recovering the nomadic terminal identifier associated with the user is performed in alter of traversing the historical usage table for the user.

5. The personal mobility system of claim 4, wherein the historical usage table is generated over tinge based upon the user's normal usage of the terminals identified in the user database.

6. A personal mobility system for nomadic computing, wherein the personal mobility system determines a terminal address based on a personal identifier of the nomadic user, the personal mobility system comprising:

a personal mobility server application including a plurality of user records;

each user record being respective to a user and indexed by a respective personal identifier, and each user record including a plurality of terminal records, each of the terminal records including a respective terminal address, at least one terminal address including a nomadic terminal address field for binding a nomadic terminal address to a terminal address; and the personal mobility server application accessing the user record for the called user based upon the personal identifier, selecting the nomadic terminal record indexed to the called user of the plurality of terminal records and returning the nomadic terminal address bound to the terminal address indexed to the called user to the personal mobility user application, wherein the user record further includes a network usage profile for the user, wherein returning the nomadic terminal identifier associated with the user is performed in alter of traversing the network usage profile for the user.

7. The personal mobility system of claim 6, wherein personal mobility server application traverses the plurality of terminal records, including respective terminal addresses, by prioritizing the nomadic terminal address field.

8. A method of determining a terminal address corresponding to a nomadic user based upon a personal identifier of the nomadic user, the method comprising:

storing a nomadic user record, wherein the nomadic user record includes a personal identifier, and a plurality of terminal records, each of the terminal records including a respective terminal address;

receiving a request from a caller, the request including the personal identifier of the nomadic user;

accessing the nomadic user record by the nomadic user personal identifier;

determining if one of the plurality of terminal records in the nomadic user record contains a nomadic terminal address; and on the basis of one of the plurality of terminal records in the nomadic user record containing a nomadic terminal address, returning the nomadic address to the caller, wherein the nomadic user record further includes a network usage profile for a nomadic user, wherein returning the nomadic address is performed in alter of traversing the network usage profile for the nomadic user.

9. The method of claim 8, wherein the step of storing a nomadic user record further comprises:

storing a historical usage table for the nomadic user; and using the historical usage table to create the network usage profile for the nomadic user.

10. The method of claim 9, wherein the historical usage table is generated over time based upon the nomadic user's usage of the terminals identified.

11. A personal mobility system for nomadic computing, wherein the personal mobility system determines a terminal address corresponding to a called user based upon a personal identifier of the called user, the personal mobility system comprising:

storing means for storing a nomadic user record, wherein the nomadic user record includes a personal identifier, and a plurality of terminal records, each of the terminal records including a respective terminal address;

receiving means for receiving a request from a caller, the request including the personal identifier of the nomadic user;

accessing means for accessing the nomadic user record by the nomadic user personal identifier;

determining means for determining if one of the plurality of terminal records in the nomadic user record contains a nomadic terminal address; and returning means for returning the nomadic address to the caller on the basis of one of the plurality of terminal records in the nomadic user record containing a nomadic terminal address, wherein the nomadic user record further includes a network usage profile for a nomadic user, wherein returning the nomadic address is performed in alter of traversing the network usage profile for the nomadic user.

* * * * *

UNITED STATES PATENT AND TRADEMARK OFFICE
CERTIFICATE OF CORRECTION

PATENT NO.     : 6,751,459 B1
DATED          : June 15, 2004
INVENTOR(S)    : Lee et al.

It is certified that error appears in the above-identified patent and that said Letters Patent is hereby corrected as shown below:

Column 28,
Line 16, after "to at", delete "leas;" and insert -- least --.
Line 57, after "over", delete "tinge" and insert -- time --.

Signed and Sealed this

Thirteenth Day of December, 2005

JON W. DUDAS
*Director of the United States Patent and Trademark Office*